US006594786B1

(12) United States Patent
Connelly et al.

(10) Patent No.: US 6,594,786 B1
(45) Date of Patent: Jul. 15, 2003

(54) FAULT TOLERANT HIGH AVAILABILITY METER

(75) Inventors: Jon Christopher Connelly, Windsor, CO (US); Craig William Bryant, Fort Collins, CO (US); Eric William Loy, Fort Collins, CO (US); Martin Shumway, Ft. Collins, CO (US)

(73) Assignee: Hewlett-Packard Development Company, LP, Houston, TX (US)

( * ) Notice: Subject to any disclaimer, the term of this patent is extended or adjusted under 35 U.S.C. 154(b) by 0 days.

(21) Appl. No.: 09/495,431

(22) Filed: Jan. 31, 2000

(51) Int. Cl.[7] ................................................. G06F 11/00
(52) U.S. Cl. ............................... 714/50; 714/4; 714/39; 709/224
(58) Field of Search ................................. 714/50, 39, 3, 714/4, 749, 13; 709/223, 222, 221

(56) References Cited

U.S. PATENT DOCUMENTS

| 4,183,462 | A | * | 1/1980 | Hideshima et al. | ........... 714/50 |
| 5,023,873 | A | * | 6/1991 | Stevenson et al. | ............. 714/4 |
| 5,157,667 | A | * | 10/1992 | Carusone et al. | ............ 340/2.7 |
| 5,704,031 | A | * | 12/1997 | Mikami et al. | ................ 709/221 |
| 5,754,754 | A | * | 5/1998 | Dudley et al. | ................. 714/18 |
| 5,790,431 | A | * | 8/1998 | Ahrens et al. | .............. 709/104 |
| 5,983,316 | A | | 11/1999 | Norwood | ..................... 711/112 |
| 6,219,701 | B1 | * | 4/2001 | Hirata et al. | ................. 709/101 |
| 6,349,335 | B1 | * | 2/2002 | Jenney | ......................... 706/50 |
| 6,401,116 | B1 | * | 6/2002 | Okigami | ..................... 709/223 |
| 6,438,705 | B1 | * | 8/2002 | Chao et al. | ...................... 714/4 |
| 6,442,713 | B1 | * | 8/2002 | Block et al. | .................. 714/43 |
| 6,496,948 | B1 | * | 12/2002 | Smorodinsky | ............... 714/37 |

OTHER PUBLICATIONS

Microsoft Computer Dictionary Fifth Ed., Publisher: Microsoft Press, Pub. date: 2002, p. 104.*

* cited by examiner

*Primary Examiner*—Robert Beausoliel
*Assistant Examiner*—Christopher S. McCarthy
(74) *Attorney, Agent, or Firm*—T. Grant Ritz

(57) ABSTRACT

A fault tolerant availability meter includes agents for stand-alone computers and each node of a cluster. The agents monitor availability with timestamps and report uptime and downtime events to a server. Additionally, agents on nodes of a cluster monitor cluster, node and package availability and cluster configuration changes and report these event to the server. Events are stored locally on the stand-alone computers and nodes, and additionally, on the server. Events are tracked with a sequence numbers. If the server receives an out-of-sequence event, an agent-server recovery procedure is initiated to restore the missing events from either the agents or the server. The server may generate availability reports for all monitored entities, including one or more stand-alone computers and one or more clusters of computers. Availability is distinguished by planned and unplanned downtime. Furthermore, unavailable and unreachable systems are identified.

16 Claims, 15 Drawing Sheets

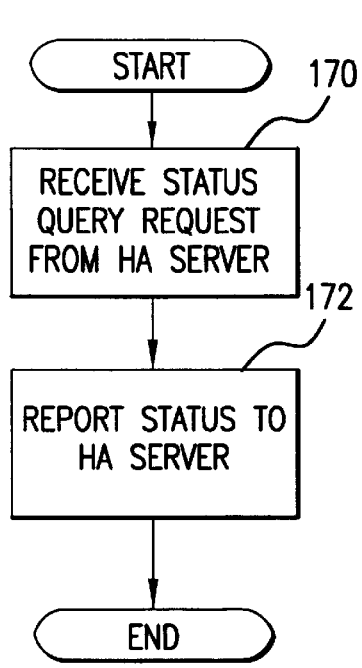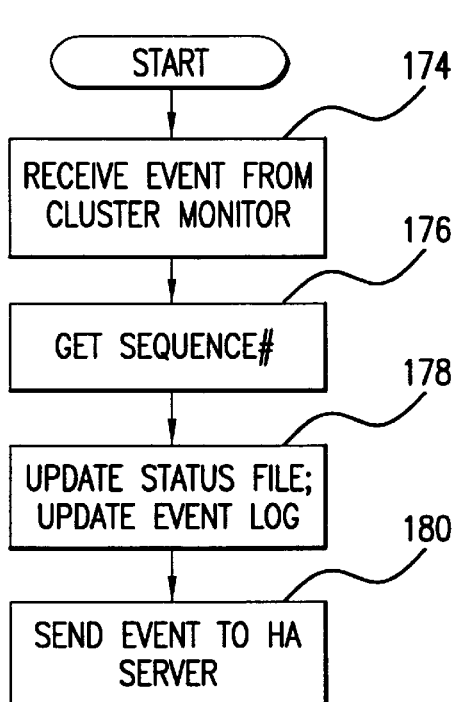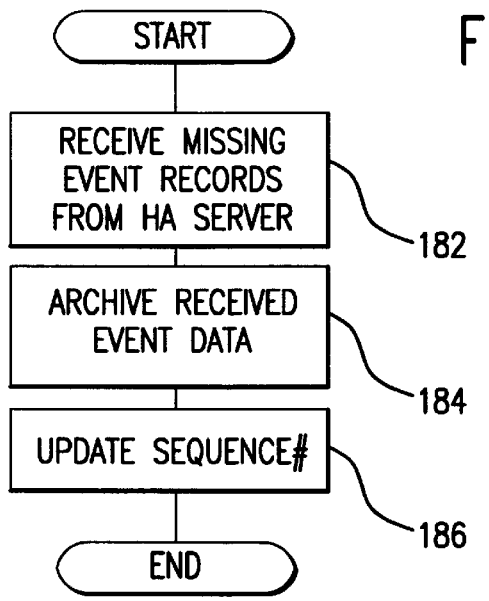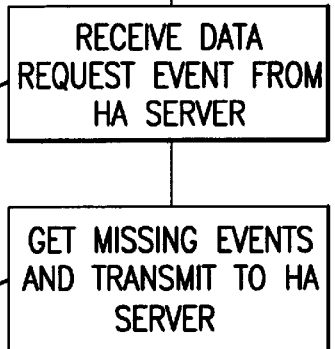
FIG.7C
FIG.7D
FIG.7E
FIG.7F

HEWLETT-PACKARD COMPANY                    HA METER AVAILABILITY REPORT
FOR 'VALUED HP CUSTOMER' FROM HAM INSTALLATION TO TUE MAR 16 11:31:23 MST 1999.                    PAGE 1 OF 1
PRINTED ON TUE MAR 16 11:31:23 MST 1999 AT SERVER ID 1234567890.

------- SYSTEM AVAILABILITY HISTORY -------
| EVENT DATE | ENTITY | TYPE | DURATION | +? P? NOTES |
|---|---|---|---|---|
| 1 SUN MAR 07 13:11:00 MST 1999 | ms3198ntb | SYSTEM | | Y BEGAN MONITORING |
| 2 SUN MAR 07 13:11:24 MST 1999 | ms3198ntb | SYSTEM | 219 | Y HALTED |
| 3 SUN MAR 07 17:18:57 MST 1999 | ms3198ntb | SYSTEM | 2 | Y HALTED |
| 4 MON MAR 08 12:42:28 MST 1999 | ms3198ntb | SYSTEM | 6 | N WENT DOWN |
| 5 WED MAR 10 10:59:50 MST 1999 | trinidad.fc.hp.com | SYSTEM | | Y BEGAN MONITORING |
| 6 WED MAR 10 11:01:29 MST 1999 | trinidad.fc.hp.com | SYSTEM | 3 | Y HALTED |

ALL TIMES IN MINUTES.
+ = EVENT ONGOING AT END OF REPORTING PERIOD.

------- AGGREGATE SYSTEM AVAILABILITY REPORT -------
NUMBER OF DOWNTIME EVENTS:                           4
   NUMBER OF UNPLANNED DOWNTIME EVENTS:              1
   NUMBER OF PLANNED DOWNTIME EVENTS:                3
AGGREGATE MONITORING TIME:                       21532
   TOTAL PLANNED DOWNTIME:                         222
   TOTAL UNPLANNED DOWNTIME:                         6
SYSTEM AVAILABILITY FOR THE PERIOD:                              0.98945

------- DETAILED SYSTEM AVAILABILITY REPORT -------
| ENTITY | ACCURACY | ENTITY INFORMATION | AVAILABILITY ?: |
|---|---|---|---|
| ms3198ntb | +/- 0.5 min | VECTRA XU 6/200 X86. NT4.0 SP3 | 0.98251 |
| trinidad.fc.hp.com | +/- 0.5 min | HP-UX B.10.20 A 9000/869 | 0.99975 |

? = UNREACHABLE AT TIME OF REPORT, AVAILABILITY MAY BE SUSPECT.

------- HA METER ERROR REPORT -------
NO ERRORS LOGGED DURING THE REPORTING PERIOD.

FIG.8E

```
EVENT, I?, DATE          ,TIME       ,UTC (ms)      ,ENTITY     ,TYPE   ,UPTIME ,DOWNTIME ,+? ,P? ,,ENTERPRISE    ,SERVER ID    ,NOTES
1, Y, SUN 07 MAR 1999, 13:11:00 MST,920837460718, ms3198nlb, SYSTEM ,    1,     0,  , Y, ,H P CUSTOMER, 1234567890 ,BEGAN MONITORING
2, Y, SUN 07 MAR 1999, 13:11:24 MST,920837484921, ms3198nlb, SYSTEM ,    0,   219,  , Y, ,H P CUSTOMER, 1234567890 ,HALTED
3, Y, SUN 07 MAR 1999, 16:49:47 MST,920850587125, ms3198nlb, SYSTEM ,   30,     0,  , Y, ,H P CUSTOMER, 1234567890 ,
4, Y, SUN 07 MAR 1999, 17:18:57 MST,920852337296, ms3198nlb, SYSTEM ,    0,     2,  , Y, ,H P CUSTOMER, 1234567890 ,HALTED
5, Y, SUN 07 MAR 1999, 17:20:10 MST,920852410468, ms3198nlb, SYSTEM , 1163,     0,  , Y, ,H P CUSTOMER, 1234567890 ,
6, Y, MON 08 MAR 1999, 12:42:28 MST,920922146500, ms3198nlb, SYSTEM ,    0,     6,  , N, ,H P CUSTOMER, 1234567890 ,WENT DOWN
7, Y, MON 08 MAR 1999, 12:47:48 MST,920922468406, ms3198nlb, SYSTEM , 4511,     0,+ , Y, ,H P CUSTOMER, 1234567890 ,
8, Y, WED 10 MAR 1999, 10:59:50 MST,921088790203, trinidad  , SYSTEM ,    2,     0,  , Y, ,H P CUSTOMER, 1234567890 ,BEGAN MONITORING
9, Y, WED 10 MAR 1999, 11:01:29 MST,921088889218, trinidad  , SYSTEM ,    0,     3,  , Y, ,H P CUSTOMER, 1234567890 ,HALTED
10, Y, WED 10 MAR 1999, 11:03:39 MST,921089019234, trinidad  , SYSTEM , 1736,     0,  , Y, ,H P CUSTOMER, 1234567890 ,
```

SUPPLIED FIELDS

| | |
|---|---|
| EVENT | EVENT NUMBER IN THIS QUERY |
| I? | WHETHER TO INCLUDE THIS EVENT IN AVAILABILITY COMPUTATIONS |
| DATE | THE LOCAL DATE OF THIS EVENT |
| TIME | THE LOCAL TIME OF THIS EVENT |
| UTC (ms) | TIME STAMP OF EVENT WHEN GENERATED, IN MILLISECONDS, UTC |
| ENTITY | NAME OF THE SERVICE ENTITY FOR WHICH THIS EVENT WAS GENERATED |
| TYPE | TYPE OF EVENT { SYSTEM | CLUSTER | NODE | PACKAGE } |
| UPTIME | NUMBER OF MINUTES OF UPTIME FOR THE AVAILABILITY EPISODE COMMENCING WITH THIS EVENT |
| DOWNTIME | NUMBER OF MINUTES OF DOWNTIME FOR THE AVAILABILITY EPISODE COMMENCING WITH THIS EVENT |
| +? | SIGNIFIES THAT THE AVAILABILITY EPISODE WAS ONGOING AT THE CONCLUSION OF THE QUERY PERIOD. |
| P? | SIGNIFIES THE AVAILABILITY EPISODE WAS PLANNED (IE ANTICIPATED). |
| NOTES | NOTES ABOUT THE EVENT |
| ENTERPRISE NAME | NAME OF THE ENTERPRISE WHERE THIS REPORT WAS PRODUCED. |
| ENTERPRISE ID | ID OF THE HAM SERVER WHERE THIS REPORT WAS PRODUCED. |

AVAILABILITY COMPUTATION

UPTIME = 1+30+1163+4511+2+1736 = 7443

DOWNTIME = 219+2+6+3+ = 230

MONITOREDTIME = UPTIME + DOWNTIME = 7673

$$\text{AVAILABILITY} = \frac{\text{UPTIME}}{\text{MONITOREDTIME}} = 0.97002 = 97.002\%$$

FIG. 8F

FAULT TOLERANT HIGH AVAILABILITY METER

BACKGROUND OF THE INVENTION

1. Field of the Invention

This invention relates generally to a method and apparatus for measuring availability of a computer systems and clusters of computer systems.

2. Description of Related Art

Enterprises increasingly require computing services to be available on a 24×7 basis. Availability is a measure of proportion of time that a computing entity delivers useful service. The level of availability required by an enterprise depends on the cost of downtime. As availability requirements escalate, the costs to manufacture, deploy, and maintain highly available information technology (IT) resources increases exponentially. Techniques to scientifically manage IT resources can help control these costs, but these require both additional technology and process engineering, including the careful measurement of availability.

The vast majority of servers are supplied with conventional cost-effective availability features, such as backup. Enhanced hardware technologies have been developed to improve availability in excess of 95%, including automatic server restart (ASR), uninterruptable power supplies (UPS), backup systems, hot swap drives, RAID (redundant array of inexpensive disks), duplexing, manageable ECC (error checking and correcting), memory scrubbing, redundant fans, and hot swap fans, fault-resilient processor booting, pre-failure alerts for system components, redundant PCI (peripheral component interconnect) I/O (input/output) cards, and online replacement of PCI cards. The next segment of server usage is occupied by high-availability servers with uptimes in excess of 99.9%. These servers are used for a range of needs including internet services and client/server applications such as database management and transaction processing. At the highest end of the availability spectrum are systems that require continuous availability and which cannot tolerate even momentary interruptions, such as air-traffic control and stock-floor trading systems.

Multi-server or clustered server systems are a means of providing high availability, improved performance, and improved manageability. A cluster is a networked grouping of one or more individual computer systems (a.k.a., nodes) that are integrated to share work, deliver high availability or scalability, and are able to back each other up if one system fails. Generally, a clustered system ensures that if a server or application should unexpectedly fail, another server (i.e., node) in the cluster can both continue its own work and readily assume the role of the failed server.

Availability, as a measure, is usually discussed in terms of percent uptime for the system or application based on planned and unplanned downtime. Planned downtime results from scheduled activities such as backup, maintenance, and upgrades. Unplanned downtime is the result of an unscheduled outage such as system crash, hardware or software failure, or environmental incident such as loss of power or natural disaster. Measuring the extent, frequency, and nature of downtime is essential to the scientific management of enterprise IT resources.

Previous efforts to measure system availability have been motivated by at least two factors. First, system administrators managing a large number of individual computers can improve system recovery times if they can quickly identify unavailable systems (i.e., the faster a down system is detected—the faster it can be repaired). Second, system administrators and IT (information technology) service providers need metrics on service availability to demonstrate that they are meeting their predetermined goals, and to plan for future resource requirements.

The first factor has been addressed primarily through enterprise management software: complex software frameworks that focus on automated, real-time problem identification and (in some cases) resolution. Numerous vendors have developed enterprise management software solutions. Among the best known are Hewlett-Packard's OpenView IT/Operations, International Business Machines' Tivoli, Computer Associate's Unicenter, and BMC's Patrol. Generally, the emphasis of these systems is the real-time detection and resolution of problems. One side effect of their system monitoring activities is a record of the availability of monitored systems. However, the use of these enterprise management frameworks (EMFs) for availability measurement is not without certain drawbacks.

First, EMFs generally do not distinguish between "unavailable" and "unreachable" systems. An EMF will treat a system that is unreachable due to a network problem equivalent to a system that is down. While this is appropriate for speedy problem detection, it is not sufficient to determine availability with any degree of accuracy. Second, because EMFs poll monitored systems over a network, their resolution is insufficient for mission critical environments. The polling intervals are usually chosen to be short enough to give prompt problem detection, but long enough to avoid saturating the local network. Polling intervals in excess of ten minutes are typical. This implies that each downtime event has a 10-minute margin of error. High availability systems often have downtime goals of less than 5 minutes per year. Thus, systems based on polling are inherently deficient to measure availability for high availability systems with a sufficient degree of accuracy. Third, while EMFs can monitor the availability of system and network resources to a certain degree, they do not have a mechanism for monitoring redundant hardware resources such as clusters, or of detecting the downtime associated with application switchover from one system to another. For example, the availability of service for a cluster may be 100% even though one of its nodes has failed. Finally, EMFs tend to be very complex, resource intensive and difficult to deploy.

The second motivational factor has been approached in a more ad hoc fashion. The emergence of service agreements containing uptime commitments has increased the necessity of gathering metrics on service availability. For example, Hewlett-Packard has a "5 nines: 5 minutes" goal to provide customers with 99.999% end-to-end availability through products and services (equivalent to 5 minutes/year of unplanned server downtime). Previous efforts to obtain these metrics were attempted with scripts and utilities run on individual servers and manual collection of data from response centers. However, most attempts suffered from an inability to determine availability of multiple systems, including standalone servers and multiple clusters, and to determine availability accurately and over multiple reboots.

Hewlett-Packard has developed several utilities for monitoring availability. Uptime 2.0, BANG (business availability, next generation) is based on a "ping" model of operation. The utility periodically "pings" a monitored client to verify that it is up. If the client does not respond, the client is assumed to be down. However, this methodology suffers from the same deficiencies as the EMFs: that the utilities are unable to determine if the system is really down or if the network is down.

Another utility developed by Hewlett-Packard, known as Foundation Monitor, is delivered as a utility within Hewlett-Packard's Service Guard Enterprise Master Toolkit. Foundation Monitor runs as a program from each node in a cluster in a peer collection scheme. Each node is capable of reporting availability data on itself. However, Foundation Monitor does not monitor availability of stand-alone systems. Furthermore, availability reporting is somewhat inaccurate because data resides on the monitored node until gathered once every 24 hour period. Finally, data security issues are present since data is only uploaded from the monitored node every 24 hours.

Accordingly, there has been a need to centrally measure true system availability of multi-server or clustered server systems so that critical information identifying downtime events that compromise effectiveness can be discovered, fault tolerant system solutions can be designed to prevent common causes of downtime, and realistic availability goals can be created and monitored.

SUMMARY OF THE INVENTION

According to a preferred embodiment of the present invention, a fault tolerant method of monitoring one or more computers for availability may include generating an event when a computer system detects a change in its status that affects availability; transmitting the event from the computer system to a central repository; and periodically re-transmitting the event if a receipt confirmation message is not received from the central repository. The computer system may store the event in a local repository located on the computer system before transmitting the event to the central repository. If a receipt confirmation message is not received from the central repository, the event is held in a queue for re-transmission at a later time. If the computer system receives a status request from the central repository, in addition to reporting status, the computer system will transmit the events held in the queue.

The present invention also includes a fault tolerant method of monitoring one or more computers for availability, where the method may include generating an event containing a sequence number when a computer system detects a change in its status that effects availability; transmitting the event from the computer system to a central repository; comparing the sequence number of the event with a next expected sequence number computed from reading the central repository; and synchronizing events between the computer system and the central repository if the sequence number does not match the next expected sequence number. A copy of each event may be maintained in a local repository on the computer system. If the sequence number matches the next expected sequence, the events and sequence numbers are stored in the central repository. If the sequence number is greater than the next expected sequence number, the central repository requests the missing events from the computer system. If the sequence number is less than the next expected sequence number, the central repository determines whether the event has already been received. If the event has already been received, the event is discarded. If the event has not already been received, the computer system has lost events and the central repository sends the missing events to the computer system.

The present invention also includes a system for measuring availability of computers. The system may include a network, a local support computer coupled to the network, a stand-alone computer system coupled to the network, and a cluster of computers coupled to the network. The stand-alone computer system is programmed to monitor itself for availability and to transmit availability events to said local support node. The cluster of computers includes nodes and packages. Each of the nodes is programmed to monitor itself for cluster, node and package availability and to transmit availability events to the local support node. The local support node computes availability for the computer system and the cluster of computers based on the availability events received. The local support node can be further coupled to a remote support computer.

BRIEF DESCRIPTION OF THE DRAWINGS

The foregoing and other aspects, features, and advantages of the present invention will become apparent from the following detailed description, taken in conjunction with the accompanying drawings, illustration by way of example the principles of the invention.

FIGS. 7A–F are flowcharts illustrating an operational procedure and various event processing procedures for the agent component of FIG. 3, according to the preferred embodiment;

FIGS. 8E–F are printouts illustrating output of the reporting and exporting procedures of the server component of FIG. 5, according to the preferred embodiment.

DETAILED DESCRIPTION

A high availability ("HA") meter or monitor, according to a preferred embodiment of the present invention, accurately measures availability of computers, including stand-alone servers and clusters of computers. Unlike prior art availability meters based on complex management frameworks, the present invention is preferably lightweight, easily installed, highly accurate and able to centrally monitor clusters. Additionally, the availability meter is advantageously robust: monitorable entities may be discovered automatically; multiple systems and clusters can be monitored; availability data may be maintained over multiple reboots; retry mechanisms are provided to transmit availability data in the presence of network or software failures; and data recovery mechanisms can preserve availability data across disk failures.

Figure 1:
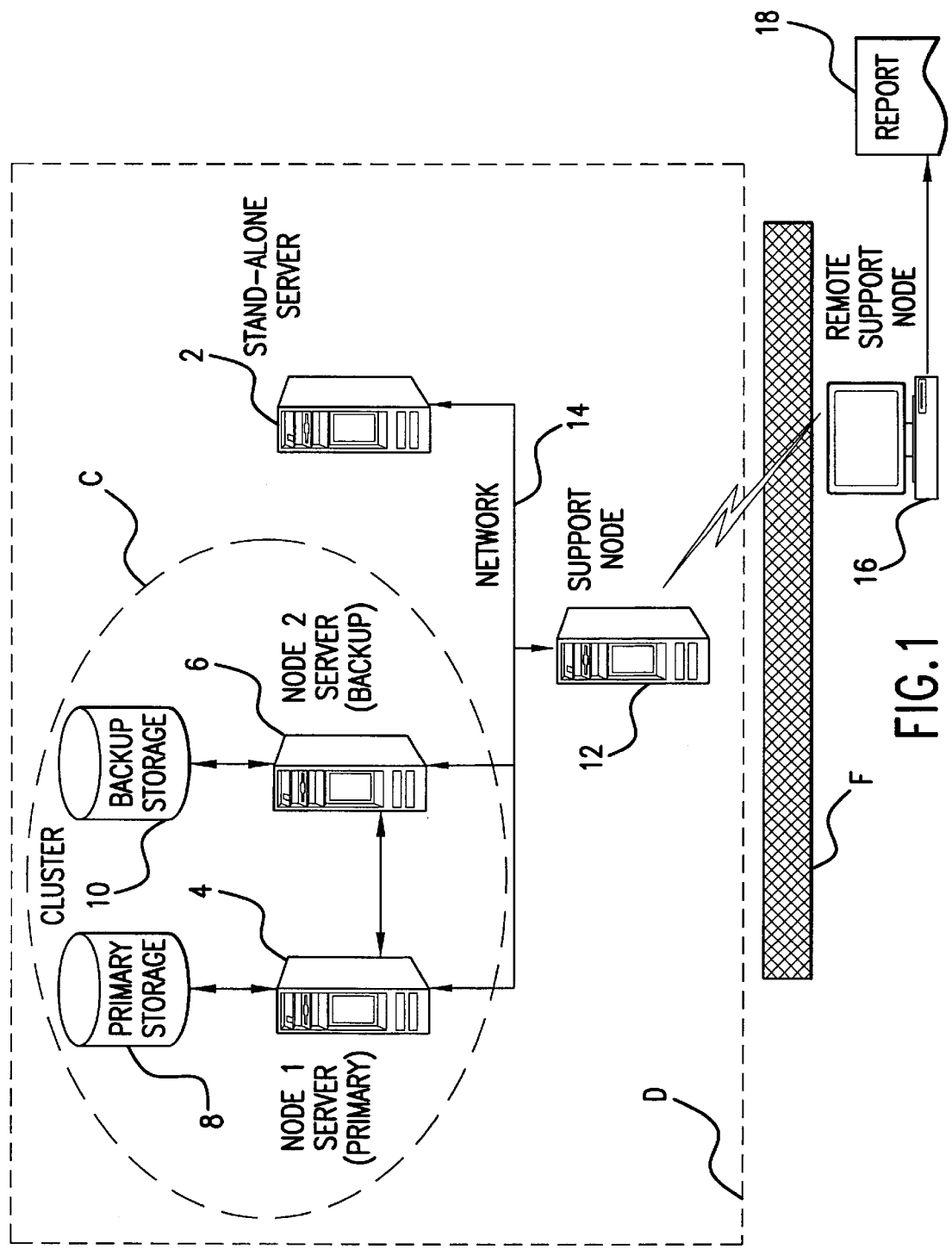
FIG. 1 is a block diagram illustrating a computing datacenter D, upon which an embodiment of the high availability meter of the present invention may be implemented.

Now referring to FIG. 1, there is illustrated a computing data-center D, upon which an embodiment of the high availability meter of the present invention may be implemented. The high availability meter is related to a distributed software system capable of computing availability metrics on both stand-alone servers 2 and clusters C. In particular, the high availability meter is capable of collecting availability metrics for multiple entities, such as stand-alone servers or systems, clusters, nodes, and packages. Systems, clusters, nodes and packages are collectively referred to as monitored entities.

In FIG. 1, an exemplary two node cluster C is shown comprised of a node A server 4 (i.e., primary server) and a node B server 6 (i.e., backup server), each coupled to a storage system (i.e., storage system 8 and storage system 10 respectively). A cluster is a networked grouping of one or more individual computer systems (a.k.a., nodes) that are integrated to share work, deliver high availability or scalability, and are able to back each other up if one system fails. The nodes may have one or more central processing units or microprocessors, and are generally similar, if not identical, and each can be used by itself to perform a particular task. Those having ordinary skill in the art will recognize that the cluster shown is only one of many different clustering methods. Other passive and active clustering methods, such as passive standby, duplicate everything, share nothing, and share everything are equally applicable to the present invention. Additionally, other storage system technologies, such as disk mirroring and RAID (redundant array of inexpensive disks) technology may be used. A package is a cluster-aware software element, such as a software application along with its programs, resources, and files, which may be restarted on another node in the event of a failure. Oracle's Parallel Server database is an example of a cluster-aware software application.

In a preferred embodiment, the clusters are formed with Hewlett-Packard's ("HP") MC (multi-computer)/ServiceGuard solution implemented on HP 9000 enterprise servers each running a HP Unix (HP-UX) operating system. MC/ServiceGuard is a software facility for protecting mission-critical applications from a wide variety of hardware and software failures. The nodes of the cluster may be connected in a loosely coupled manner, each maintaining its own processor(s), memory, and operating system. Special communications protocols and system processes bind these nodes together and allow them to cooperate to provide a high availability of services. Alternatively, clusters could be formed with Windows NT, Novell or Unix servers using high-availability technologies, such as Microsoft's Cluster Service (a.k.a., Wolfpack), Novell's High Availability Solutions, Banyan Vines' products, NSI Software's products and Marathon Technologies Corporation's Assured Availability products. Although alternative clustering technologies may refer to systems, nodes and packages as "resources," the application of the present invention to those alternative technologies is not diminished.

The stand-alone server 2 is preferably a RISC-based (reduced instruction set computer) HP 9000 enterprise server running HP-UX. Alternatives include Intel-architecture machines made by various manufacturers; and other RISC-based computers made by manufacturers such as HP, IBM (International Business Machines), and Sun. Alternative operating systems include Windows NT, NetWare, SCO (Santa Cruz Operation), and Sun Solaris.

A local support node 12 is coupled to the monitored entities such as cluster C and the stand-alone server 2. The local support node 12 serves as a central data repository and a management console for the high availability meter. The local support node 12 is coupled to the cluster C and the stand-alone server 2 by a network 14, such as a TCP/IP (transmission control protocol/internet protocol) local area network ("LAN"). Other alternative network topologies, data transmission technologies, physical links, and geographically dispersed networks may also be used.

The high availability meter may conveniently operate entirely behind a firewall F, but yet allow remote access to availability data. A remote support node 16 can establish a dial-up connection with the local support node 12 for the purpose of instructing the local support node 12 to generate and download a report 18 containing availability information. Thus, availability data from multiple monitored systems can be collected from one or more support nodes 16. For example, an information technology service provider can install a high availability meter at a number of customer datacenters. Periodically, the service provider (e.g., remote support node 16) can connect with the customer's datacenter to gather the availability data in order to identify downtime events that prevent service.

Figure 2:
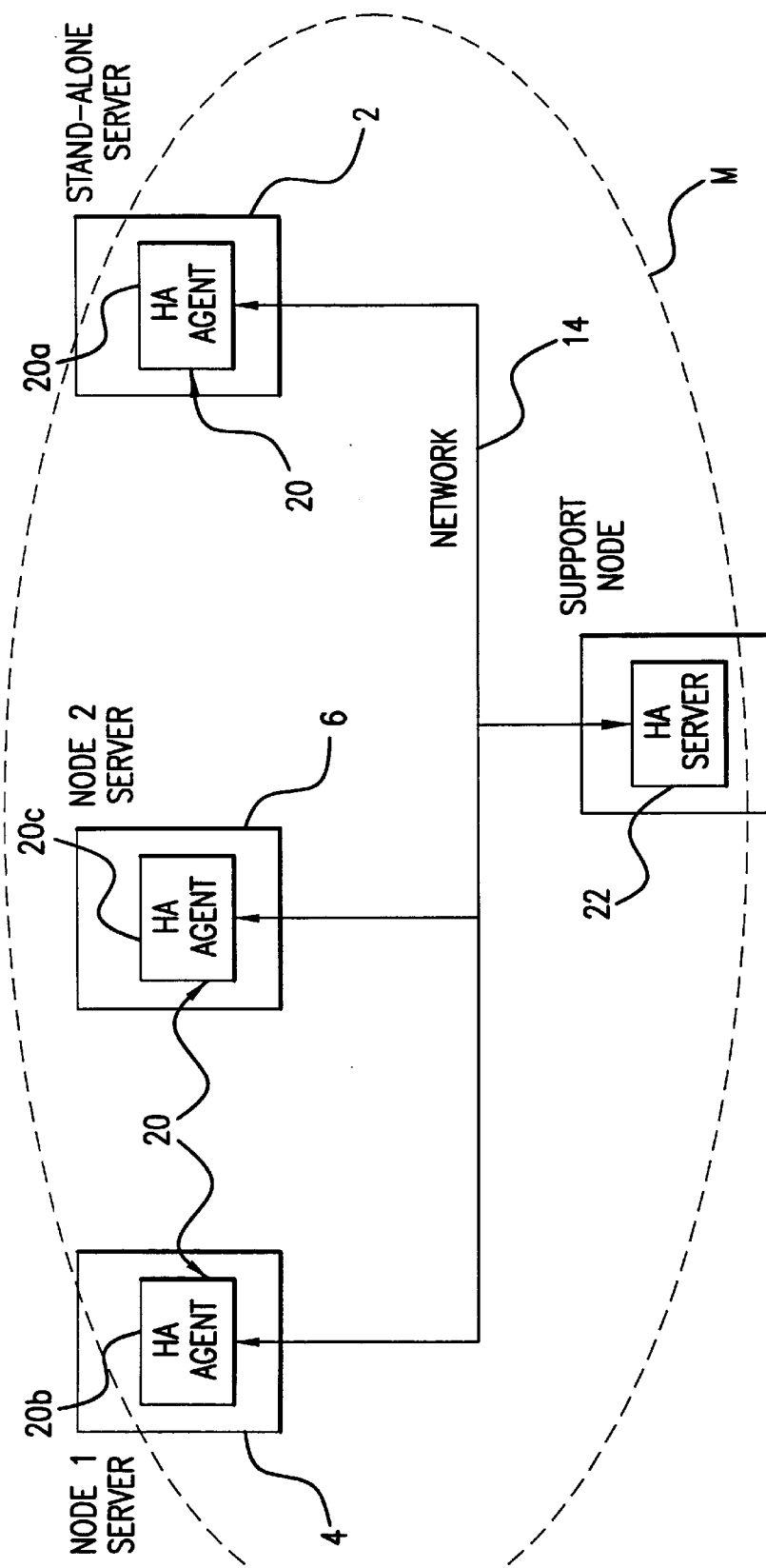
FIG. 2 is a block diagram illustrating a high availability meter architecture according to the preferred embodiment.

Referring now to FIG. 2, there is illustrated a software architecture of a high availability ("HA") monitor M according to a preferred embodiment. The HA meter M includes one or more HA agent components 20 and a HA server component 22. Each system that is monitored for availability by the HA meter M has a HA agent 20 installed. For example, the stand-alone server 2 includes a HA agent 20a, the node A server 4 includes a HA agent 20b, and the node B server 6 includes a HA agent 20c.

Each HA agent 20 monitors the availability of the system on which it is installed and generates events when changes in system availability or configuration are detected. Additionally, if the system is a node of a cluster, the HA agent 20 also generates events when availability or configuration changes to the cluster, nodes, or packages are detected.

Preferably, the HA server 22 is installed on the local support node 12, which may be a non-monitored workstation or server. However, the HA server 22 can also coexist with the HA agent 20 on the same system to form an alternative embodiment. For example, the local support node 12 could be monitored by installing the HA agent on the local support node 12; or a production server such as stand-alone server 2 could host the HA server 22. In any case, the HA server 22 receives events from the HA agents 20 and logs the events in a central data repository. The events are logged on the local support node 12 and are available for report generation, data export and HA meter M management.

The HA meter M is beneficially designed to minimize utilization of network resources. Essentially, no network traffic (i.e., event) is generated between the agents 20 and the server 22 unless the state of a monitored entity changes. The HA server 22 rarely polls the HA agent 20. During normal operations, each HA agent 20 maintains availability data locally. Unless a system crash or cluster change event is detected, no events are generated.

Additionally, the HA meter M can distinguish between "unavailable" systems and "unreachable" systems. HA agents 20 that cannot be reached over the network 14 archive availability data until a connection can be reestablished with the HA server 22. No unavailability is reported for unreachable systems that are not "down."

The HA agent 20 may receive a status query request from the HA server 22. A status query event is similar to a ping command in that it merely provides an indication of whether a system is reachable. The HA agent 20 may reply to the status query with either "OK," "EVENTS PENDING" or "ERROR." If no response is received by the HA server 22, the server will ping the system to determine whether the network 14 is down or whether the HA agent 20 is down. The purpose of these requests is to verify that the monitored entity is not currently down and that the HA server 22 has the most up-to-date availability data for the entity. If not, the HA server 22 requests the HA agent to resend the missing availability data. For example, when reports are generated on the HA server 22, a request will be sent to the HA agent 20 on each monitored system to determine whether the system is currently up.

Availability data is stored on both monitored systems (e.g., servers 2, 4, and 6) and the HA server 22. In the event of disk failures, most or all availability data will be recoverable. Each event generated on a monitored system carries a unique sequence number. The HA server 22 also maintains a history of sequence numbers for events originating on each monitored system. A sequence mismatch indicates an inconsistency between the states of the HA server 22 and the system on which the event originated. In the event of a sequence mismatch, a recovery procedure is initiated to resynchronize the monitored system and the HA server 22.

Figure 3:
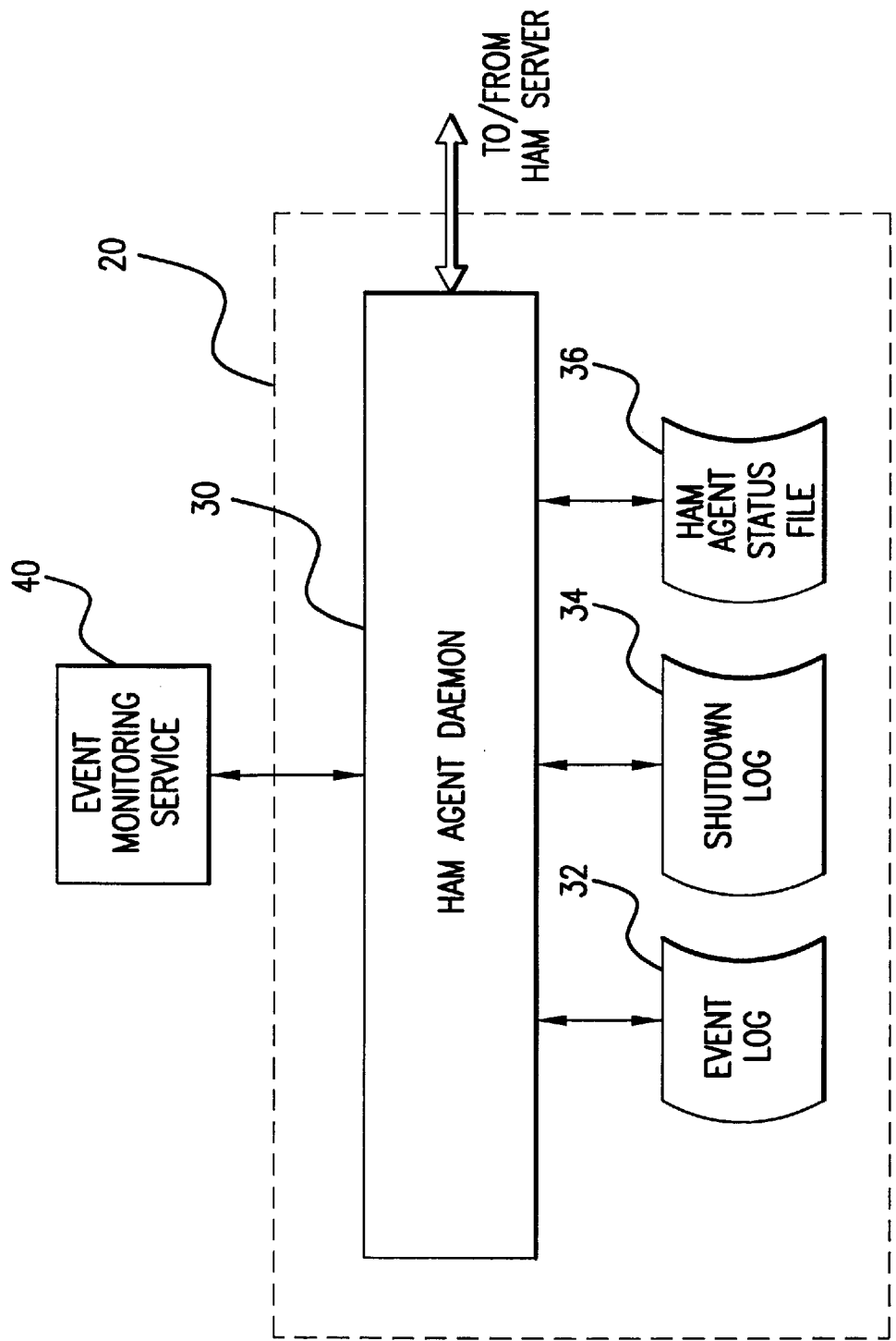
FIG. 3 is a block diagram illustrating an agent component of the high availability meter of FIG. 2, according to the preferred embodiment.

Now referring to FIG. 3, there is illustrated an architecture of the HA agent 20 according to the preferred embodiment. The HA agent 20 includes four logical components: a HA agent daemon 30, a local event log 32, a shutdown log 34, and a local status file 36.

The HA agent daemon 30 preferably runs at the user root level as a daemon process under the operating system of the monitored system. During normal operations, the HA agent daemon 30 writes a timestamp to the status file 36 at a programmable interval, such as 30 seconds. If the monitored system is halted using the "shutdown" command, the HA agent daemon 30 will prompt the operator for a reason for the shutdown, write the reason to the shutdown log 34, send a "planned shutdown" event to the HA server 22, and update the event log 32. An exemplary list of shutdown reasons is listed in Table I below.

The HA agent daemon 30 is configured to restart automatically at boot time. Upon restart, the HA agent daemon 30 checks the shutdown log 34 to see if a system event was generated (graceful shutdown) when the monitored system went down. If so, the shutdown log 34 is deleted or cleared and a "restart" event is sent to the HA server 22. If no "shutdown" event was sent (crash), then the timestamp in the status file 36 is used to compute the approximate time the system went down and both a "unplanned shutdown" and a "restart" event are sent to the HA server 22.

TABLE I

SHUTDOWN CAUSE SELECTION

| Cause # | Failure |
|---|---|
| 1 | Hardware Failure such as storage, memory, power supply, fan, I/O controller or processor. |
| 2 | Operating System Failure |
| 3 | Application Failure |
| 4 | Middleware Failure |
| 5 | Patch/Software Installation |
| 6 | Kernel Reconfiguration |
| 7 | Hardware Upgrade/Install |
| 8 | Hardware Reconfiguration |
| 9 | Scheduled Reboot |

TABLE I-continued

SHUTDOWN CAUSE SELECTION

| Cause # | Failure |
|---|---|
| 10 | Other Scheduled Maintenance |
| 11 | System Backup |
| 12 | Environmental Failure such as power failure, earthquake or storm |
| 13 | Other as specified |

On an individual computer such as stand-alone server 2, there is one monitored entity: the computer. On a system that is part of a cluster such as cluster C, there are multiple monitored entities: the cluster, nodes and packages. If the monitored system is part of a cluster, the HA agent 20 also receives cluster, node and package events from an event monitoring service 40. These events are also logged in the event log 32.

In the preferred embodiment, the event monitoring service 40 is a system monitoring application designed to facilitate real-time monitoring and error detection for enterprise systems, such as cluster C. In an alternative embodiment, the real-time monitoring of cluster resources could be designed into the HA agent 20. In particular, the event monitoring service 40 can monitor the operational status of nodes and packages within a cluster to report on the availability of the nodes, packages and of the cluster as a whole.

The HA agent daemon 30 registers with the event monitoring service 40 upon installation to receive changes in cluster availability, such as clusters to which the monitored system belongs, and packages about which the monitored system has information.

Whether HA agent 20 is monitoring a stand-alone server 2 or cluster C, events are captured and reported to the HA server 22. An event may either indicate availability or unavailability of a particular resource (i.e. availability event) or may indicate a change to the configuration of a system, node, package or cluster (i.e., configuration event). Thus, availability and configuration events are related to a particular system, node, package or cluster. For example, if a node fails several events may be generated: a node event may be generated to indicate that the node has failed; a first package event may be generated indicating that a package on the failed node has failed; a second package event may be generated indicating that the package has been restarted on a backup node; and one or more configuration events may be generated indicating the change in cluster configuration. Table II indicates the types of data included in an event.

TABLE II

| AVAILABILITY DATA | CONFIGURATION DATA |
|---|---|
| Event timestamp | Hostname |
| Entity (system, node, package, cluster) | System ID |
| Source | Model type and number |
| State | OS type |
| EventType | OS revision |
| Shutdown/Cause string (for system events) | Timezone |
| Sequence number | |

The availability and configuration events are listed in Table III.

TABLE III

1) Monitor start events
   a) System - The HA Agent has started monitoring this system.
   b) Cluster - The HA Agent has started monitoring this cluster.
   c) Node - The HA Agent has started monitoring this node.
   d) Package - The HA Agent has started monitoring this package.
2) Monitor restart events
   a) System - The system rebooted.
   b) Cluster - The cluster is back up.
   c) Node - The node is back up.
   d) Package - The package is back up.
3) Monitor shutdown events
   a) Planned - The system underwent an orderly shutdown.
   b) Unplanned - The system crashed.
4) Cluster state change events
   a) Cluster
      i) Up - The cluster is back up.
      ii) NotUp - The cluster went down.
   b) Node
      i) Up - The node is back up.
      ii) NotUp - The node went down.
   c) Package
      i) Up - The package is back up.
      ii) NotUp - The package went down.
   d) Configuration Change
      i) System - The system configuration changed
         (in some way that affects availability measurement).
      ii) Cluster - The cluster configuration changed.

Figure 4:
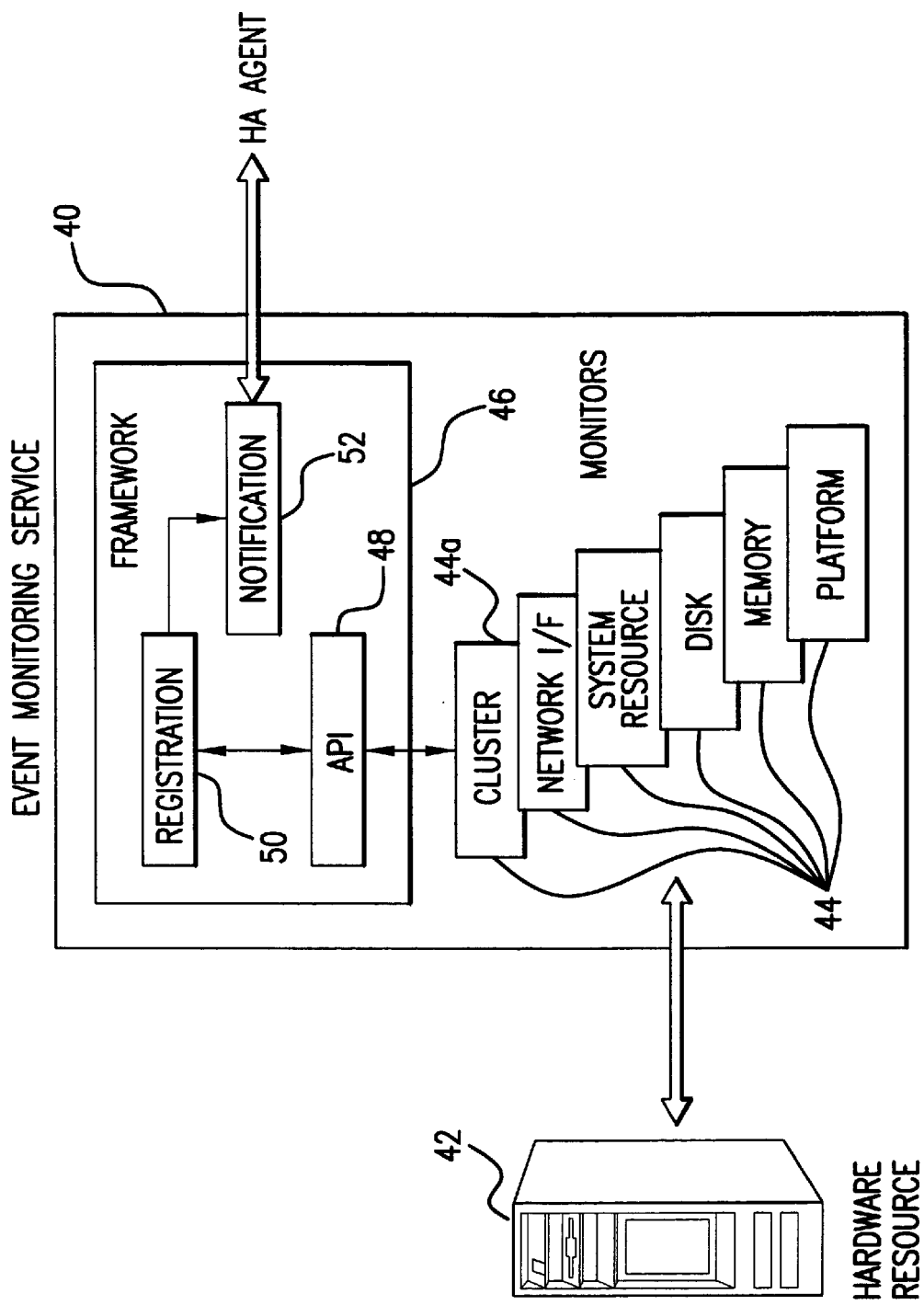
FIG. 4 is a block diagram illustrating an event monitoring service of the agent of FIG. 3, according to the preferred embodiment.

Referring now to FIG. 4, there is illustrated a block diagram of the event monitoring service 40 ("EMS"). The EMS 40 monitors system and cluster resources 42, such as disks, tapes, memory, nodes and packages. In the preferred embodiment, the EMS 40 is a hardware vendor-supplied service to provide a high level of protection against undetected hardware failures that could interrupt system operation or cause data loss. The EMS 40 is a middleware application comprised of a set of monitors 44 operating within a framework 46, such as HP's Event Monitoring Service.

The monitors 44 observe designated resources 42 and report back resource values or events to the framework 46. Resources supported by monitoring include mass storage devices such as disks and tapes, connectivity devices such as network adapters, system resources such as memory and processors, and cluster resources such as nodes and packages. Monitors 44 are applications written to gather and report information about specific resources on the system. The monitors 44: provide a list of resources 42 that can be monitored; provide information about the resources 42; monitor the resources 42 it supports; and provide values or events to the framework 46. Any unusual or notable activity experienced by a hardware resource may be an event. For example, an event may report that a disk drive is not responding, or that a tape drive does not have a tape loaded. Monitors 44 may be either: event driven (asynchronous notification) or polled for status. Asynchronous notification is preferred, but not all monitors support asynchronous notification. Monitors 44 supporting only the polled method are acceptable provided the polling period can be sufficiently short to measure availability to a desired accuracy. In the preferred embodiment, a polling period less than 30 seconds is sufficient. One example of a disk monitor is described on U.S. Pat. No. 5,983,316 entitled "Computing System having a System Node that Utilizes both a Logical Volume Manager and a Resource Monitor for Managing a Storage Pool," hereby incorporated by reference herein.

A cluster monitor 44a is a special type of monitor 44 designed to monitor cluster, node and package status on the cluster C. In the preferred embodiment, the cluster monitor 44a makes use of cluster MIBs (management information base) that are managed by daemons responsible for tracking status of nodes and packages. Generally, the node status is tracked with a heartbeat mechanism. Package status is tracked by the process or task ID assigned by the OS when the package is launched. Status changes to the cluster, node and package are reported in the form of an event to the EMS 40, which in turn provides the information onto the interested HA agent 20.

The framework 46 provides the interface between the HA agent 20 and the monitors 44. The framework 46 starts and stops the monitors 42, stores information used by the monitors, and directs monitors where to send events. During installation, the HA agent 20 registers with the event monitoring service 40 so that notifications are sent via transmission control protocol (TCP) to the interested HA agent 20. The framework 46 contains an applications programming interface (API) 48, registrar 50, and notification mechanism 52. The registrar 50 includes a dictionary for a list of available resources 42 and related monitors 44. The framework 46 evaluates the data and determines if any clients, such as the HA agent 20, have registered interest in this event. Events generated by the monitors 44 are captured by the framework 46 and forwarded in an appropriate format by a notification process 52 to the HA agent 20.

Figure 5:
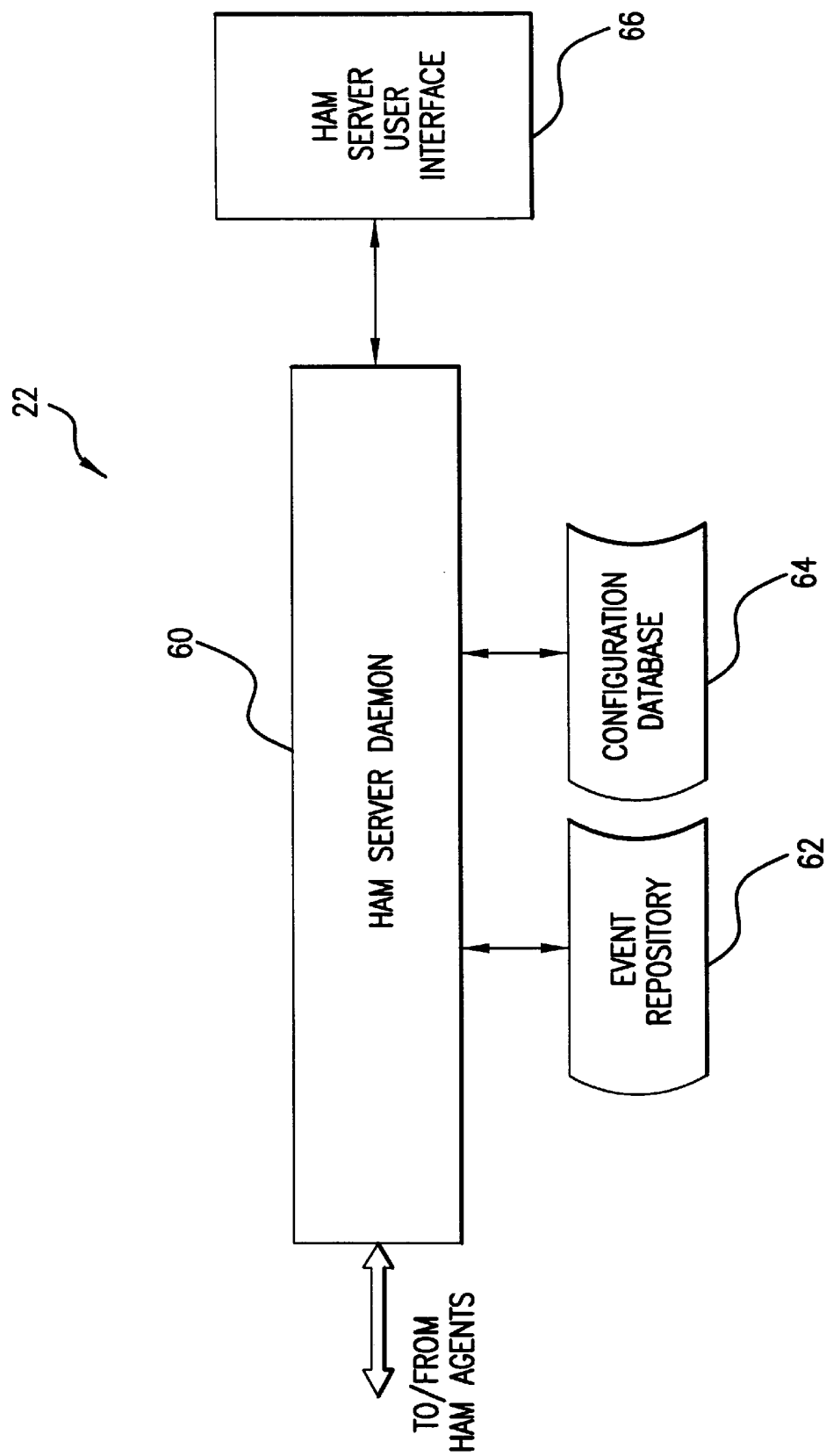
FIG. 5 is a block diagram illustrating a server component of the high availability meter of FIG. 2, according to the preferred embodiment.

Now referring to FIG. 5, there is illustrated an architecture of the HA server 22 according to the preferred embodiment. The HA server 22 is preferably installed on the local support node 12 and runs at the user root level as a daemon process under the operating system. The HA server 22 includes four logical components: a HA server daemon 60, an event repository 62, a configuration database 64, and a user interface 66. The HA server 22 receives, acknowledges and processes events from HA agents 20 of monitored systems, and requests from the user interface 66. Output of the HA server 22 includes requests to monitored systems and data exported or displayed through the user interface 66 and the remote support node 16. The HA server 22 serves three primary functions: it serves as an on-site repository for all availability data of a data center D; it serves as a management console for the distributed HA meter M; and it provides facilities for exporting or displaying HA meter data.

Preferably, all availability and configuration events received from HA agents 20 are archived in the event repository 62. Availability events are used to construct a history of uptime and downtime for each monitored entity, as well as aggregate availability for sets of entities. Additionally, a history of availability and configuration events is maintained as part of a data recovery mechanism.

It is possible that disk crashes or other catastrophic events could cause a loss of data at either the HA agent 20 or HA server 22 if the system state is restored from backup media. For this reason, each event received from the HA agent 20 contains a sequence number. If the HA server 22 is restored from backup, it is possible that previously received event messages are lost. If the HA agent 20 is restored from backup, it is possible that the HA server 22 may receive a duplicate event message. These situations are detected when sequence numbers are out-of-sequence. An agent-server recovery procedure (FIG. 8B) is provided to recover lost data from either the HA agent 20 or HA server 22.

Certain system and cluster events may contain data on current site configuration. In the case of system, node or package events that particularly affect cluster configuration, the HA server daemon 60 upon receiving the event, updates the cluster configuration database 64. The configuration database 64 is used by the HA server 22 to synthesize a global view of cluster status based on events received from individual cluster nodes. For example, if an event reports that node A server 4 is down and another event reports that a package switched over to node B server 6 and the database indicates that nodes A and B are part of the cluster C, the HA meter M will report that the package is still available and that cluster C is still operational. The configuration database 64 is also used to infer availability for situations in which no events are received. For example, if an event reports that node B server 4 is down, it can be inferred that all packages running on the node are also down. On the other hand, a system may be unreachable in which case the node assigned to the system and the packages assigned to the node are also considered unreachable.

The configuration database 64 tracks cluster configuration changes as they are received from the HA agents 20. Clusters are also comprised of packages, which loosely represent the business services (e.g., application or database) performed by the datacenter D. Each package is either running on a node or not allocated. A package is considered unavailable if it is not allocated. A cluster configuration may undergo changes and these changes are also tracked in the configuration database 64. For example, if a node has been added or removed from the cluster C. However, if a node (e.g., 4 and 6) has been added to the cluster C but no cluster monitor 44a has been configured for the node, then its state is maintained as unmonitored and it does not contribute to any availability computation. Thus, the cluster, node and package availability events interpreted in view of the configuration database 64 provides the HA meter M with an accurate view of cluster, node and package availability.

The user interface 66 consists of a series of HP-UX commands, such as in Table IV. The user interface 66 will allow users to install or delete HA agent 20 software on a monitored system, export availability data, report availability over a specified period of time for individual entities or sets of entities, query the state of monitored entities, and report the configuration of monitored entities.

TABLE IV

| COMMAND | FUNCTIONALITY |
| --- | --- |
| hamadd | Install the HA agent on a system and begin monitoring the system. |
| hamdelete | Delete the HA agent from a system |
| hamexport | Export availability data for use in other applications. |
| hamreport | Report availability over a specified period of time for servers, nodes, packages or clusters; report aggregate availability; report unplanned availability. |

The HA server daemon 60 contains most of the HA server 22 logic and handles all incoming and outgoing events, whether they originate at a monitored client or in the user interface 66. Like the HA agents 20, the HA server 22 is an event driven process. During normal operation it will sleep until an event is received. It will then process the event, possibly generate secondary events, and then go back to sleep. The HA server daemon 60 also manages all HA meter M data, and generates availability reports and summaries. A more detailed description of the function and operation of the HA server daemon 60 follows.

For each monitored entity, availability is computed by the HA server 22 according to the following formula:

$$\text{Availability\_per\_period} = \frac{\text{Total\_period} - \sum_{event=1}^{K} \text{Downtime\_period}}{\text{Total\_period}}$$

where Total_period is the period during which the entity has been monitored, and Downtime_period is the duration of an individual outage event, and there were K outages for the period. Availability per_period ranges from 0 to 100%.

The HA meter M distinguishes two types of system downtime: planned and unplanned. A planned event includes the orderly shutdown of a host computer. Most other events are considered as unplanned. The availability metric computed by the HA meter M preferably includes all downtime, regardless of cause or planned versus unplanned status. Alternatively, because more interest is focused on unplanned downtime in contrast to planned downtime, availability could also be computed without regard to planned downtime. Downtime may be defined differently for each monitored entity and is discussed further below.

System downtime may be defined as the time between system shutdown or crash and the restart of the HA agent 20. "Planned" versus "unplanned" downtime is distinguished primarily on the basis of how the system is shutdown. If a customary shutdown command, such as a Unix "/sbin/shutdown" or Windows NT "shutdown", is used to halt the system, the downtime is treated as "planned." Otherwise, the shutdown is treated as "unplanned." The time of the system shutdown or crash is computed from the corresponding timestamp in the shutdown log if the system was stopped gracefully, or from the last timestamp in the HA agent status file 36 if the system crashed or was halted without the "shutdown" command. If a downed system is restarted in a diagnostic mode or single-user mode, the time spent in these modes is counted as "downtime" (i.e., not available for service).

The cluster, node and package entities have different downtime definitions. Cluster downtime may be defined as any interval in which the cluster is halted or all cluster nodes are down or halted. Node downtime may be defined as any interval in which the node status (relative to a given cluster) reported by the cluster monitor 44a is not "running," or any interval in which the system on which the node is running is known to be unavailable. Package downtime may be defined as the time between package failure or halt on a given cluster node, and its startup on another (or the same) node in the same cluster. Package failure or halt is indicated when the package status reported by the cluster monitor 44a changes from "up" to "not up" on a given system, or when a system downtime event is received for the system on which the package is running. Package restart is indicated when an cluster monitor 44a sends a package notification event with status of "up." Package failover and restart time are counted as "downtime."

During normal operation, the HA server 22 will sleep until an event is received. The HA server 22 will then process the event, possibly generate secondary events, and then go ba to sleep. The HA server 22 can receive four types of events. Availability events and configuration events originate from HA agents 20 running on monitored systems. Data request events and management events originate in the HA server user interface 66.

Availability and configuration events are sent from a monitored entity to indicate that the state of the monitored entity has changed. When an availability or configuration event is received, the HA server 22 first checks the event sequence number and initiates any necessary recovery protocols. The event is then archived, the configuration database 64 is updated, and any secondary events are generated.

Inferred events are generated by the HA server daemon 60 at the time an availability report is generated. Inferred events are the mechanism used to infer availability data for entities from which no events were received. Inferred events are not stored in the event repository 62, but are used to complete an availability report. Inferred events are generated as follows: system downtime implies node downtime at the time of the system downtime; system downtime implies package downtime for all packages known to be running on the specified system; and system downtime implies cluster downtime if the given system was the sole remaining system in the cluster, or the sole available system in a cluster.

Secondary events are a type of housekeeping event generated by the HA server daemon 60 to account for missing configuration events in response to a "monitor stop" availability event. If a package is deleted from a node, a "monitor stop" event will be sent from the HA agent 20 to the HA server 22. In response, the HA server 22 updates the event repository 62 and the package status is marked as "down" and the package continues to be monitored. However, because the package was deleted from the node, no further monitoring of availability is warranted. Thus, in response to this "monitor stop" event, the HA server daemon 60 generates a secondary event to update the configuration database 64 to reflect that the package is no longer present on the node. Thus, availability monitoring for this deleted package is no longer reported.

Data request events and management request events originate in the HA server user interface 66 and are communicated to the HA server daemon 60. Data is returned to the user interface 66 and written to standard out. Data request events cause the HA server 22 either to export HA meter data in a format such as CSV (comma delimited text) suitable for a report generation tool like a spreadsheet, such as shown in FIG. 8E.

Management request events cause the HA server daemon 60 to install or deinstall HA agent software on a specified system. Deinstallation will not cause the HA server daemon 60 to delete all data associated with the specified system since the data may be needed for historical analysis.

Figure 6A:
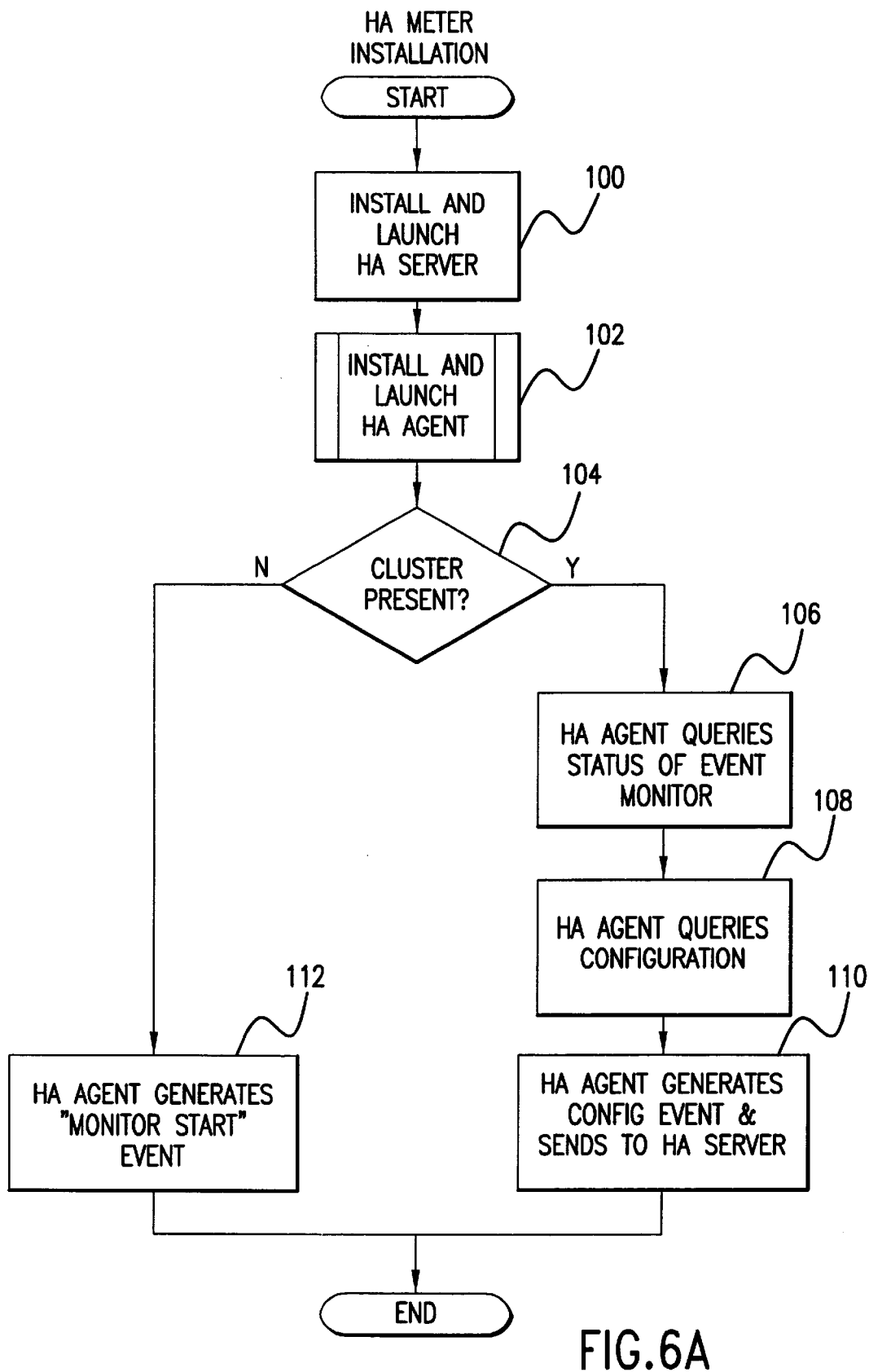
FIGS. 6A–B are flowcharts illustrating an installation procedure for the high availability meter of FIG. 2, according to the preferred embodiment.

Referring now to FIG. 6A, there is illustrated a flowchart of a procedure for installing the HA meter M on a collection of systems, such as site D. According to the preferred embodiment, the HA server 22 should be installed before the HA agent 20 so that the HA agent can conveniently register with the HA server upon installation. This preference is reflected in the flowchart where at step 100 the HA server 22 is installed on the local support node 12. Next at step 102, a sub-procedure installs each HA agent 20 on the monitored systems, such as node 4 and 6, and stand-alone server 2. Next at step 104, the installation procedure determines whether the HA agent was installed on a cluster. If so, the procedure branches to step 106. Otherwise, the procedure branches from step 104 to step 112 (discussed below).

At step 106 the installation procedure causes the HA agent 20 to query the cluster event monitor 44a to receive status of the clusters to which the system belongs (i.e., cluster C), packages about which the system has information, and other nodes belonging to the same cluster. Additionally at step 108, each HA agent 20 installed on a cluster node (i.e., agent 20b and 20c) causes a cmviewcl utility to be executed to capture cluster configuration information. This utility reports the configuration map of the cluster C (i.e., which systems, nodes packages, the name of the cluster, other clusters), and their current availability state. At step 110, the HA meter installation procedure causes each installed HA agent 20 to generate a "monitor start" event and provide to the HA server 22 the information received in steps 104 and 106. Steps 102–112 can be repeated for each monitored system.

After installation, the HA agents 20 and HA server 22 are operational without rebooting the system. Preferably, the HA agent 20 is automatically installed via management scripts provided by the HA server 22, but alternatively the agent can be manually installed according to normal software installation procedures. The HA agent 20 and HA server 22 may co-exist on the same system.

Figure 6B:
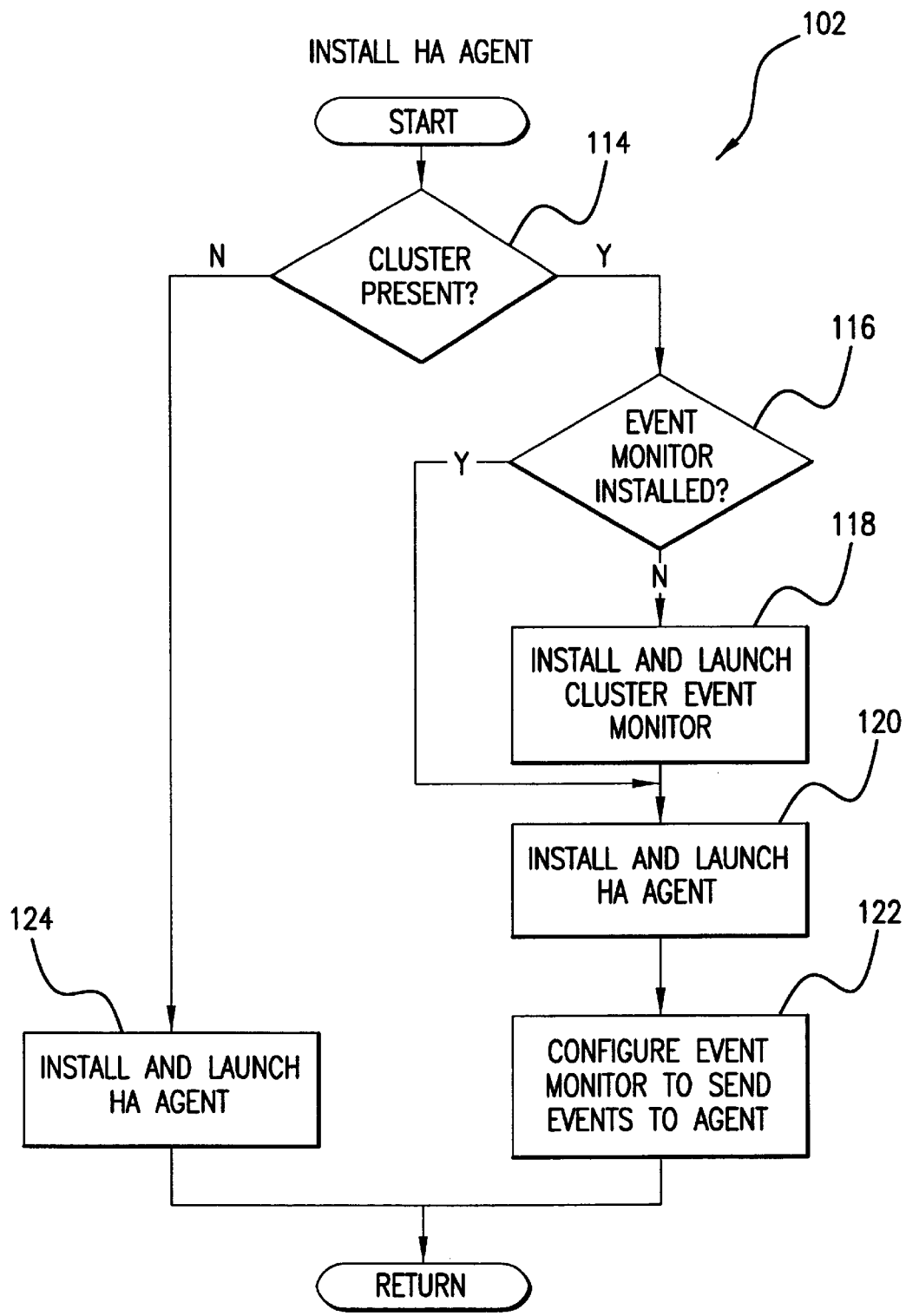

FIG. 6B illustrates a flowchart of a sub-procedure 102 for installing each HA agent 20 on each monitored system. At a step 114, the HA agent installation procedure determines whether the system on which the installation is taking place is part of a cluster. If the system is not part of a cluster, the procedure branches from step 114 to step 124 where the HA meter installation procedure installs and launches the HA agent 20 software on the monitored system. Startup and shutdown scripts are provided to ensure that the HA agent 20 is started and stopped automatically.

The determination of whether the system is part of a cluster is accomplished by looking for clustering software such as HP's MC/ServiceGuard. If the system is part of a cluster, the procedure branches to step 116 where the procedure automatically detects whether cluster event monitors 44a are installed. The EMS registrar 50 can be queried to determine which event monitors 44 are installed. If a cluster event monitor 44a is installed, the procedure branches from step 116 to step 120 (discussed below). If a cluster event monitor 44a is not installed, the HA meter installation procedure continues to step 118 where the HA cluster event monitor 44a is installed. To collect cluster data, a HA agent 20 and a cluster event monitor 44a must be installed on each cluster node 4 and 6. The procedure continues from step 118 to step 120.

At step 120, the HA meter installation procedure installs and launches the HA agent 20 software on the monitored system. Startup and shutdown scripts are provided to ensure that the HA agent 20 is started and stopped automatically. Next at step 122, the procedure configures the cluster event monitor 44a to send event messages to the newly installed HA agent 20. From steps 124 and 122, the installation procedure returns to step 102.

Figure 7A:
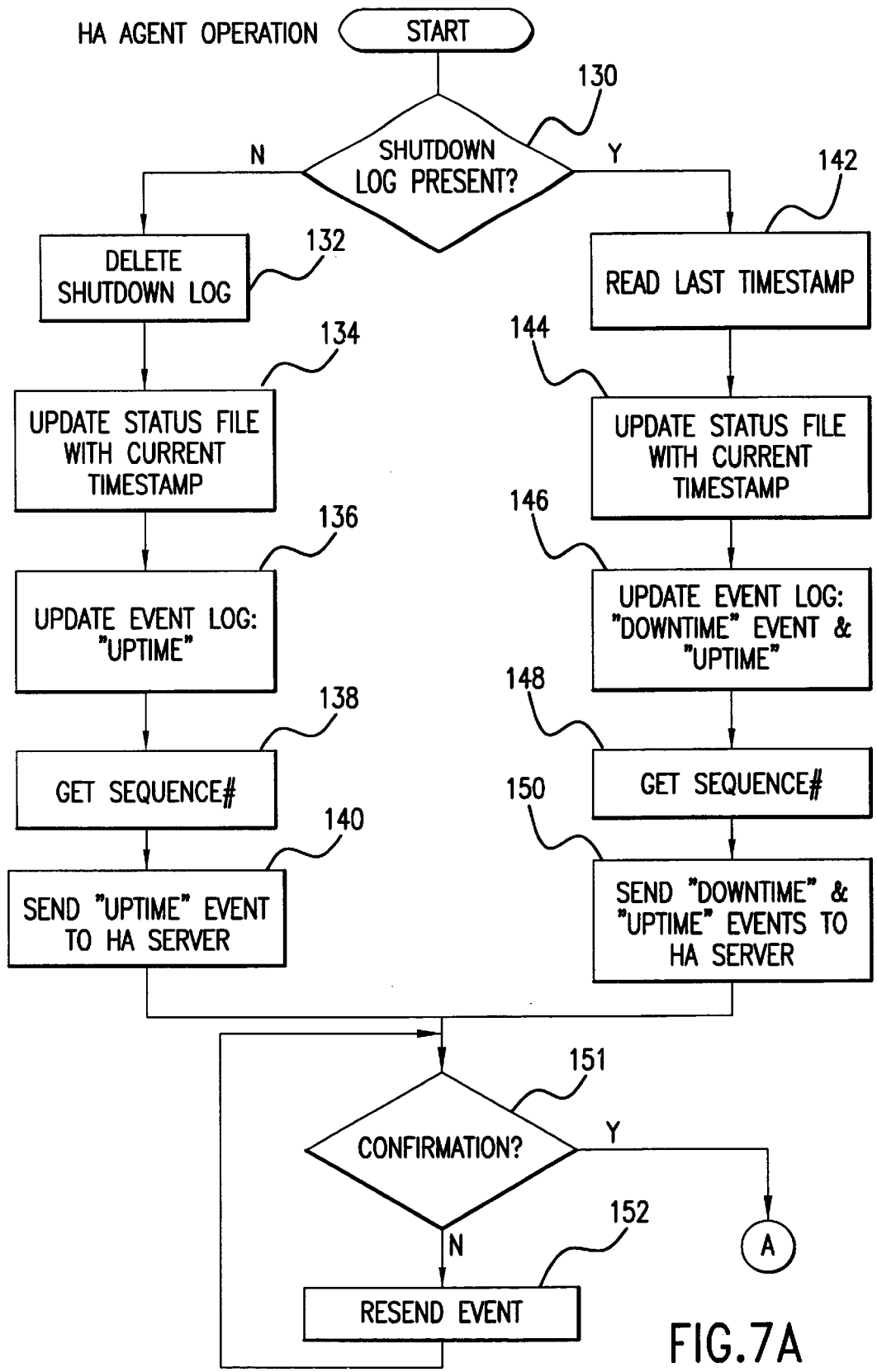
Figure 7B:
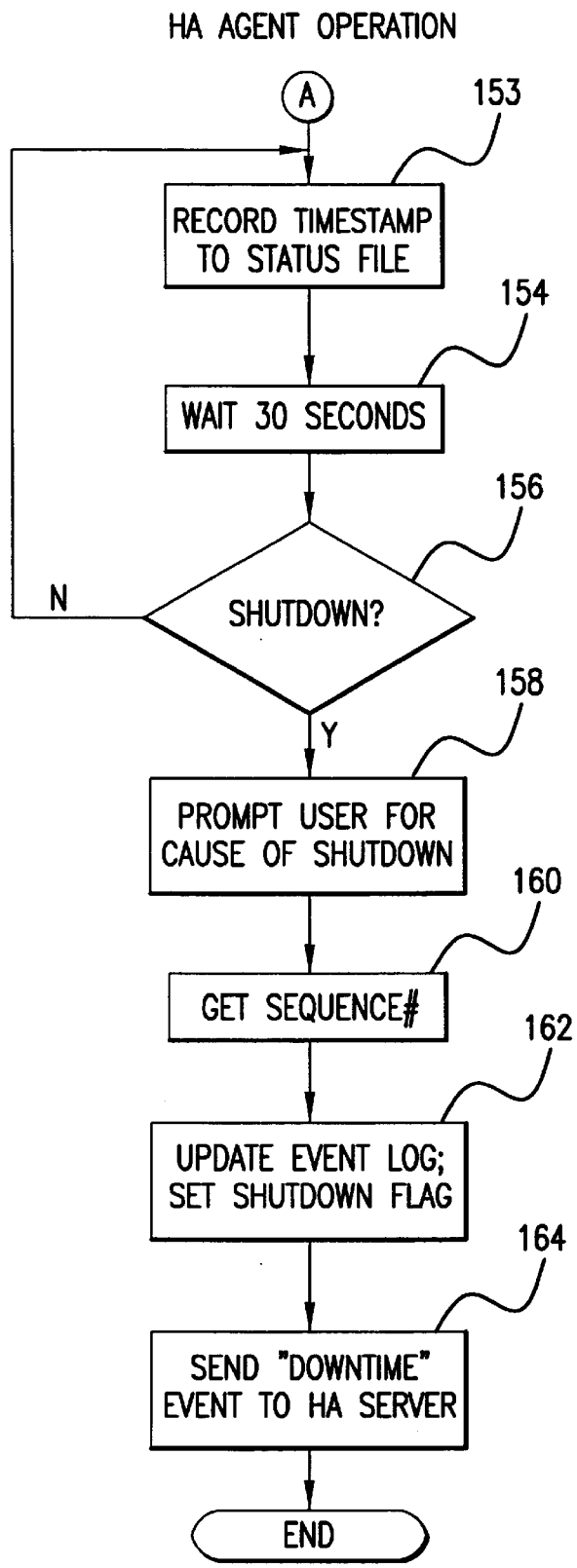

Now referring to FIGs. 7A–B, there is illustrated a flowchart of an operational procedure of the HA agent 20. For simplicity, the procedure is illustrated as a single process although in the preferred embodiment the procedure is implemented as several event driven processes. The startup scripts cause the HA agent 20 to start operation before the cluster event monitor 44a so that events are captured by the HA agent 20 when the system boots or halts. Likewise, the shutdown scripts cause the cluster event monitor 44a to be shutdown before the HA agent 20.

The HA agent 20 is restarted automatically at boot time. At step 130, the HA agent 20 will check for the presence of the shutdown log 34 to see if a downtime event was generated when the system went down (i.e., graceful shutdown). The presence of the shutdown log 34 indicates that a graceful shutdown occurred. If a downtime event was generated, the procedure branches to steps 132–140 where the shutdown log 34 is deleted and the HA server 22 is notified that the system is up. At step 132, the shutdown log 34 is deleted. Next at step 134, the status file 36 is updated with the current timestamp. At step 136, the event log 32 is updated with a "system uptime" event. Events are archived in the event log 32 before transmission to the HA server 22. This allows events to be retransmitted in the presence of communication failures between the HA agent 20 and HA server 22 or data loss at either system. At step 138, a sequence number is generated by adding one to the previous event sequence number stored in the event log 32. At step 140, the "system uptime" event is sent to the HA server 22. The "system uptime" event contains the time the system returns to operational status (i.e., current timestamp), the sequence number and system identification data, such as in Table II. From step 140, the procedure continues to step 151, discussed below.

If a downtime event was not generated when the monitored system went down (i.e., crash), at step 130 the procedure branches to steps 142–150 where a shutdown time is approximated and the HA server 22 is notified that the system cycled. At step 142, the last timestamp is read from the status file 36. At step 144, the status file 36 is updated with a current timestamp. At step 146, the event log 32 is updated with a "downtime" event and a "uptime" event. The timestamp for the "downtime" event is approximated based on the last recorded timestamp in the status file 36. Because a timestamp is written periodically, such as 30 seconds, it can be assumed that a crash must have occurred within 30 seconds of the last timestamp. Thus, the timestamp for the "downtime" event could be approximated to be the last recorded timestamp, or within 30 seconds of the last recorded timestamp. The timestamp for the "uptime" event is simply the current timestamp. At step 146, a sequence number is generated by adding one to the previous event sequence number stored in the event log 32. At step 150, the "downtime" and "uptime" events are sent to the HA server 22. The procedure continues from step 150 to step 151.

The HA agent 20 may be unable to initiate contact with the HA server 22 due to network partition, unavailable HA server system, or internal HA server problems. At step 151, the HA agent 20 checks for a confirmation message from the HA server 22 indicating receipt of the transmitted events. If a confirmation message has not been received, the process branches to step 152 where the event is placed on a queue for re-sending after a configurable delay, such as one hour. If a confirmation message is received, the process continues from step 151 to step 153. If the HA agent 20 crashes before the queue is flushed, the uncommunicated events will be detected with a sequence mismatch and a recovery protocol will be initiated.

At step 153, the HA agent 20 begins a deadman timer loop to periodically update the status file 36 in the event of a system crash. A timestamp is recorded in the status file 36 at step 153. The HA agent 20 waits for a predetermined period of time, such as 30 seconds, before recording another timestamp in the status file 36. If while updating the status file 36, the HA agent at step 156 detects a shutdown operation, the procedure will branch to step 158. If no shutdown operation is detected, the procedure continues to loop from step 156 to step 153. Although illustrated here as part of a larger operational process, this deadman timer loop runs continually in the background. The predetermined period of time can be increased to lower system utilization, or decreased to improve the accuracy of estimating crashtime.

At step 158, the procedure tracks a graceful shutdown by prompting the user for a cause of the shutdown. The user may respond with a cause such as those listed in Table I. At step 160, the procedure begins to prepare an event message by generating a sequence number for the event. Before the event is sent to the HA server 22, the HA agent 20 at step 162 records a timestamp in the status file 36 and records the event in the event log 32. Because this is a graceful or planned shutdown, a shutdown log 34 is created. The shutdown log 34 is an empty file that simply acts as a shutdown flag. At step 164, the procedure generates and sends a "downtime" event to the HA server 22 to indicate that the monitored system was shutdown. The HA server 22 will use the downtime event in calculating unplanned and planned downtime for the monitored system.

Now referring to FIGs. 7C–F, there are illustrated various event processing procedures performed by the HA agent 20. FIG. 7C illustrates a flowchart of a procedure responsive to a status query request from the HA server 22. The purpose of a status query request is for the HA server 22 to verify that the monitored system is not currently down and that the HA server 22 has the most up-to-date availability data. This is desirable since a system "downtime" event may not be reported to the HA server 22 until the system is restarted, which could lead to temporary inaccuracies in system data availability calculations. At step 170, a status query request is received by the HA agent 20 from the HA server 22. At step 172, the HA agent 20 may reply to the status query with either "OK," "EVENTS PENDING" or "ERROR." A status of "OK" indicates that the HA agent is functioning correctly and that all availability events have been successfully transmitted to the HA server 22. An "EVENTS PENDING" status indicates that the HA agent has not yet reported all events to the HA server 22. In response to the status queue request, any queued events are immediately sent to the HA server 22. An "ERROR" status indicates that the HA agent 20 is unable to function as expected; the query response also indicates a troubleshooting message, such as "cluster event monitor not responding." Failure to respond to a status query request indicates that either the system is "unreachable" (i.e., network failure) or the HA agent 20 is "down." The HA server 22 may attempt to distinguish between these cases by pinging another monitored system. A successful ping indicates that the problem is most likely with the HA agent 20, and an appropriate error message will be included with the expected data. An "unreachable" system will be temporarily assigned a status of "UNREACHABLE" by the HA server 22.

FIG. 7D illustrates a flowchart of a procedure performed by the HA agent 20 in response to a cluster event. In step 174, a cluster event is received from the cluster event monitor 44a. If the cluster event monitor 44a is not designed to send event messages when status changes, alternatively, the HA agent 20 could poll the cluster event monitor 44a for status changes. At step 176, the HA agent 20 prepares to package the cluster event in an availability or configuration event in accordance with the data types listed in Table II. In particular, a sequence number is generated for the event. At step 178, the status file 36 is updated with a current timestamp and the event is logged in the event log 32. At step 180, the event is transmitted to the HA server 22.

FIGS. 7E–F illustrate flowcharts of procedures performed by the HA agent 20 in response to the HA server 22 identifying a loss of data. It is possible that disk crashes or other catastrophic events could cause a loss of HA Meter data if system state is restored from backup media. The agent-server recovery protocols illustrated in FIGS. 7E–F are designed to recover lost data when possible.

Receipt by the HA server 22 of a duplicate event sequence number indicates either the delivery of a duplicate event (possibly due to temporary loss of connectivity) or a loss of data on the monitored system. The HA server 22 checks the message content to determine if it is in fact a duplicate. Duplicate events are simply discarded; however, a new event with a reused sequence number indicates a loss of data on the monitored system. In this case, the HA server 22 generates a restore data event and transmits the missing event records back to the monitored system, as in step 182. The HA agent 20 archives the restored data, updates its sequence number to the proper value, and resumes operation, as in steps 184 and 186.

If the HA server 22 is restored from backup, it is possible that previously received event messages will be lost. This situation is detected when the HA server 22 receives an out-of-sequence message, indicating that some previous messages have been lost. The HA server 22 generates a data request event and transmits it to the monitored system, as in step 188. The data request event contains the sequence numbers of the missing events and results in their retransmission if they are still available on the monitored system, as in step 190. If the requested events are no longer available, a new monitoring baseline is constructed using information from the monitored system when possible.

Figure 8A:
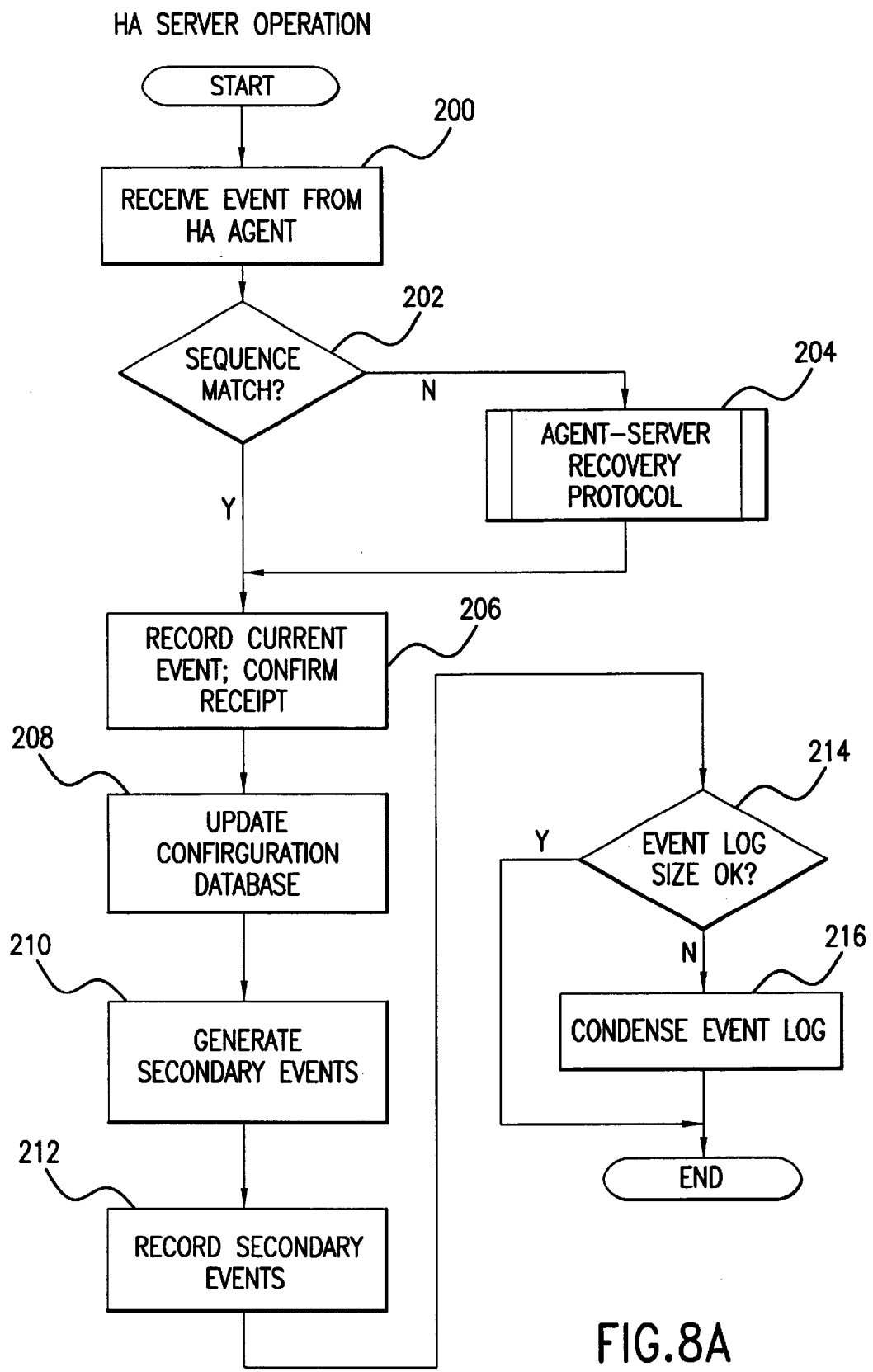
FIGS. 8A–B are flowcharts illustrating an operational procedure for the server component of FIG. 5, according to the preferred embodiment.
Figure 8B:
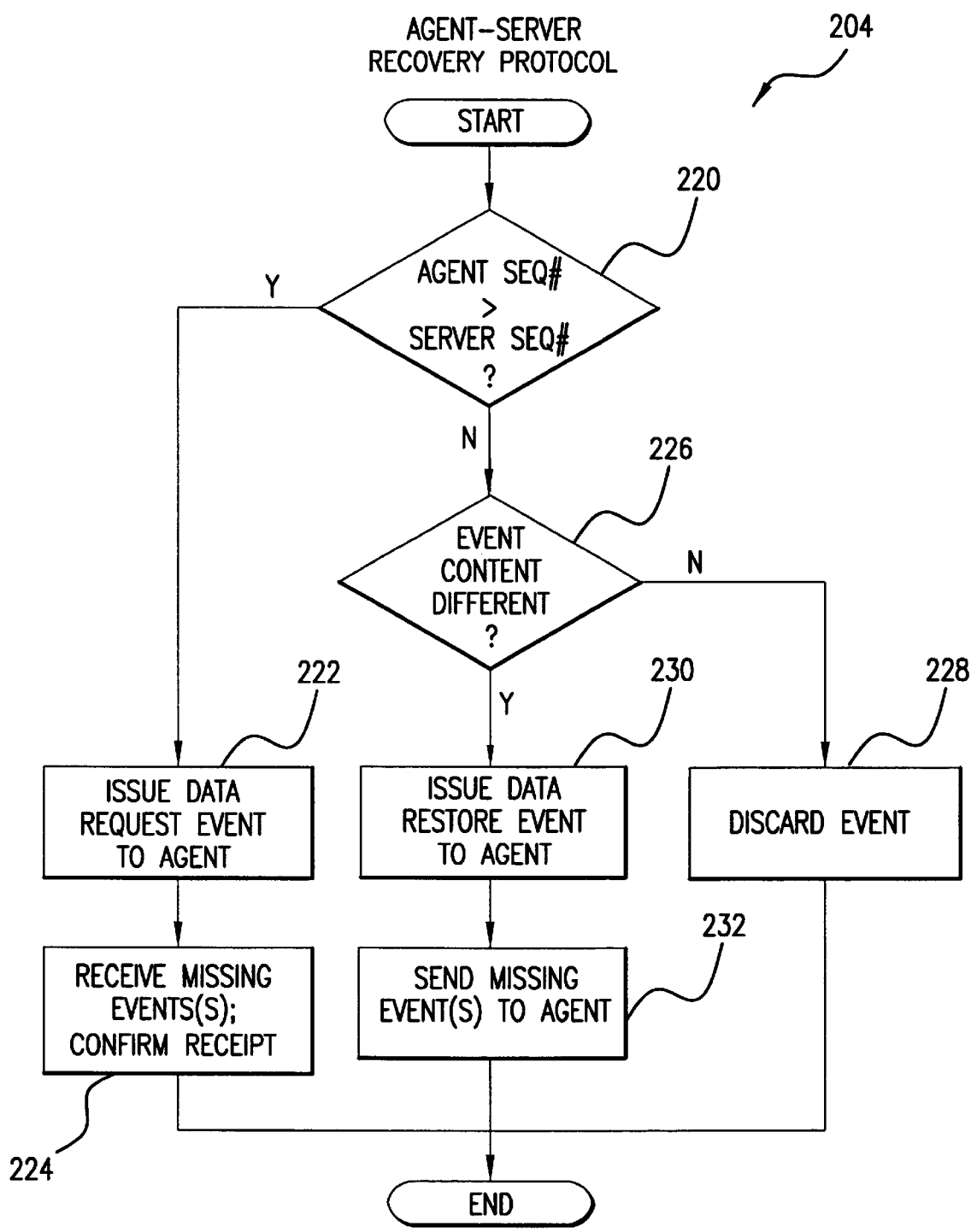

Now referring to FIGS. 8A–B there is illustrated a flowchart of an operational procedure of the HA server 22. The HA server 22 is an event driven process. Generally during normal operation, the HA server 22 will sleep until an event is received, process the event, possibly generate secondary events, and then go back to sleep.

Availability and configuration events are received from monitored systems (i.e., systems 2, 4 and 6) to indicate that the state of a monitored entity has changed, as shown in step 200. When an event is received, the HA server 22 checks the event sequence of the received event message.

The HA server 22 maintains a record of event sequence numbers for each monitored system. Sequence numbers are used to assure the proper ordering of events from a given system, the reliability of the communications medium, and the integrity of the availability data as a whole. If at step 202 the event sequences do not match, the procedure branches to step 204 to initiate an agent-server recovery procedure (discussed below). If at step 202 the event sequences match, the procedure continues to step 206 where the HA server 22 records the current event in the event repository 62 and acknowledges receipt of the event to the monitored system.

Next at step 208, the HA server 22 updates the configuration database 64, if necessary, according to the event received. The configuration database 64 tracks the structure and status of each of the monitored systems. Additionally, the configuration database 64 is used by the HA server 22 to infer availability data for which no events were received (e.g., system downtime implies package downtime). At step 210, the procedure may generate a secondary event according to the following rules:

system downtime implies node downtime;
system downtime implies package downtime for all packages known to be running on the specified system; and
system downtime implies cluster downtime if the given system was the sole remaining system in the cluster.

At step 212, all secondary events are recorded in the configuration database 64 with an annotation to indicate that they originated on the HA server 22 rather than a monitored system.

Next at step 214, the procedure checks the size of the event repository 62. If the size of the event repository 62 is larger than a programmable value, such as 5 MB, the procedure branches to step 216. Otherwise, the procedure waits for another event message to be received. At step 216, the event repository 62 is condensed by deleting availability data after it reaches a programmable age, such as 2 years. Alternatively, the data could be summarized.

Referring now to FIG. 8B, there is illustrated the agent-server recovery procedure 204. At a step 220, the procedure first determines whether the sequence number received from the monitored system is greater than the sequence number maintained by the HA server 22. If so, the procedure branches to step 222 where a data request event is transmitted to the monitored system. The HA server 22 waits at step 224 for the monitored system to return the missing events in response to the data request event. Receipt of the missing events is confirmed by the HA server 22 to the monitored system. The missing events received from the monitored system are treated as new events and processed according to steps 206–212.

If the sequence number received from the monitored system is not greater than the sequence number maintained by the HA server 22, then at step 220 the procedure branches to step 226 to determine if the event is a duplicate of an event already received. Receipt by the HA server 22 of a duplicate event sequence number indicates either the delivery of a duplicate event (possibly due to temporary loss of connectivity) or a loss of data on the monitored system. The procedure 204 checks the message content to determine if it is in fact a duplicate. Duplicate events are simply discarded at step 228.

However, a new event with a reused sequence number indicates a loss of data on the monitored system. In this case, the procedure branches to step 230 where the HA server 22 generates a restore data event and transmits the missing event records back to the monitored system, as shown in step 232. In response, the HA agent 20 will archive the missing event records. The HA server procedure goes back to sleep after processing the events.

Figures 8C, 8D:
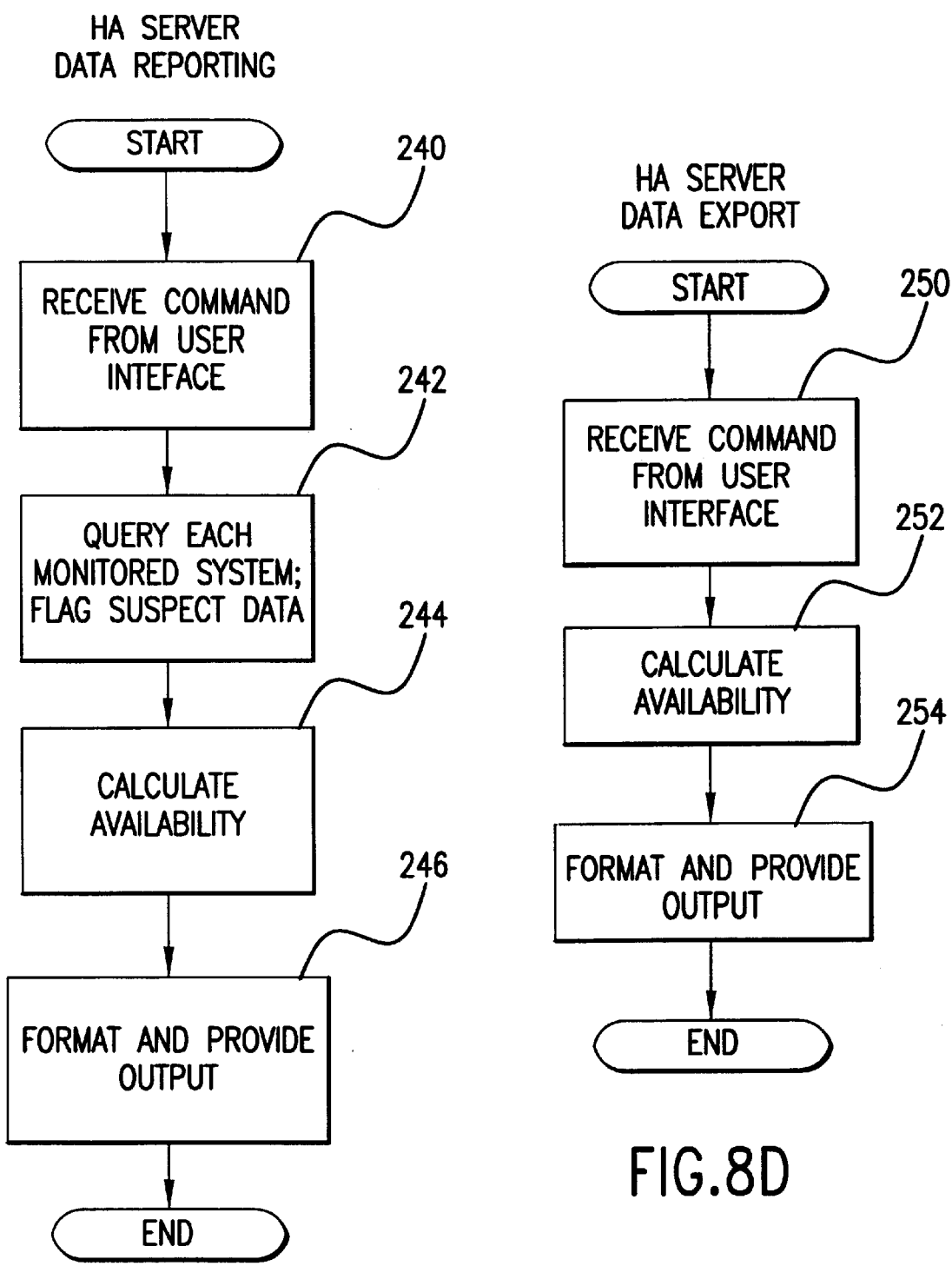
FIGS. 8C–D are flowcharts illustrating reporting and exporting procedures for the server component of FIG. 5, according to the preferred embodiment.

Now referring to FIG. 8C, there is illustrated a flowchart of a reporting procedure of the HA server 22. At step 240, the HA server 22 receives commands via the user interface 66 in the following format:

hamreport [-b begin_date] [-e end_date] [[-x]entity1 [,entity2 [. . . ]]]

where begin_date is the date and time at which availability calculations should begin, end_date is the date and time at which availability calculations should end, and entity<n> specifies the entity for which data is desired, and the -x option specifies those entities to exclude from reporting. At step 242, in response to the command, the monitored entities are queried by the HA server 22 to determine whether each monitored entity is currently reachable. This is desirable to avoid reporting inaccurate data, since a down system may not yet have reported a "downtime" event. If a system is found to be "unreachable," any data corresponding to it is flagged as potentially inaccurate. At step 244, availability is calculated according to the availability data stored in the event repository 62. Finally, the availability report is formatted and provided in step 246.

FIG. 8E illustrates an exemplary availability report. The report preferably consists of the following sections:
1. report header stating data center D name, query period, and print date;
2. for each monitored entity class (i.e., system, cluster, node, package):
    availability history during query period for that monitored entity class;
    aggregate availability statistics for all entities in each entity class; and
    detailed availability statistics and configuration information for each entity; and 3. any HA meter M errors detected during the query period.

An event history 260 shows individual downtime episodes, their duration, if any, whether they were anticipated or not (planned/unplanned), and some additional information about the event that led to the episode. If HA meter M started or stopped monitoring the entity during this period, that is shown. If downtime events were ongoing at the end of the query period, these are flagged with a '+'. Events are reported in the timezone in which they occurred, though their inclusion in the query period is determined with respect to the query period. If the downtime episode was anticipated, the planned field (denoted by P?) shows a 'Y', otherwise a 'N' is displayed.

An aggregate report 262 is devoted to summary statistics for a specified query period. These statistics reflect the monitored time of the query period, so any monitored entities that began or stopped monitoring during the query period are accounted for. If downtime episodes proceed past the end of the specified reporting interval, both the downtime and the monitored time are truncated to the query interval. The number of planned/unplanned events are reported as well as the aggregate downtime for each type of monitored entity. The final availability statistic is presented as the "availability for the period." Availability statistics only make sense with respect to the respective entity class. Thus, a single scalar value for availability for all the entities is not presented.

A detailed report 264 breaks out availability statistics by monitored entity (called out using the canonical naming scheme described above), and then summarized for all entity classes. Entity specific data are also reported, including configuration information (i.e., version number) and reporting accuracy. If the entity was unreachable at the report generation, this situation will be signified with the '?' annotation. In this case, the downtime episode may be later rectified when the system returns on-line, either as no downtime at all (network connectivity was responsible), or with more accurate figures. This may occur the next time hamreport is run.

Now referring to FIG. 8D, there is illustrated a flowchart of a data export procedure of the HA server 22. At step 250, the HA server 22 receives commands via the user interface 66 in the following format:

hamexport [-b begin_date] [-e end_date] [[-x]entity1 [,entity2 [. . . ]]]

where begin_date is the beginning date and time for exported events, end_date is the end date and time for exported events, and entity<n> specifies the entity for which data is desired. At step 252, availability is calculated according to the availability data stored in the event repository 62. At step 254, the availability data is formatted into a format suitable for import into a spreadsheet and output to a file. All availability periods (uptime, downtime and unmonitored time) are displayed for the query period. FIG. 8F illustrates exemplary output from the data export procedure.

Therefore, it can be seen from the foregoing that the invention provides a novel method and apparatus for measuring availability of computer systems and clusters of computers. Although several embodiments and variations of the invention have been described and illustrated, the invention is not to be limited to the specific forms or arrangements of the parts so described and illustrated. Thus, having illustrated and described the principles of the invention in a preferred embodiment, it should be apparent to those of ordinary skill in the art that the invention can be modified in arrangement and detail without departing from such principles.

What is claimed is:

1. A fault tolerant method of monitoring one or more computers for availability, comprising:
    generating an event when a computer system detects a change in its status that affects availability;
    transmitting the event from the computer system to a central repository; and
    periodically re-transmitting the event if a receipt confirmation message is not received from the central repository.

2. The method of claim 1, further comprising:
    storing the event in a local repository located on the computer system before transmitting the event.

3. The method of claim 1, further comprising:
    holding the event in a queue if a receipt confirmation message is not received from the central repository.

4. The method of claim 3, further comprising:
    receiving a status request from the central repository;
    providing a status update on the computer system in response to the status request; and
    providing events held in the queue to the central repository in response to the status request.

5. The method of claim 1, wherein the event is re-transmitted after one hour.

6. The method of claim 1, wherein the computer system is a cluster.

7. The method of claim 1, wherein the computer system is a stand-alone server.

8. The method of claim 1, wherein the change of status includes changes in availability and configuration.

9. The method of claim 1, wherein an event indicating a change in availability includes a timestamp, event type and source designator.

10. A fault tolerant method of monitoring one or more computers for availability, comprising:
    generating an event containing a sequence number when a computer system detects a change in its status that effects availability;
    transmitting the event from the computer system to a central repository;
    comparing the sequence number of the event with a next expected sequence number computed from reading the central repository; and
    synchronizing events between the computer system and the central repository if the sequence number does not match the next expected sequence number.

11. The method of claim 10, further comprising:
    storing events and sequence numbers in the central repository if the sequence number matches the next expected sequence number.

12. The method of claim 10, further comprising:
    maintaining a copy of each event in a local repository on the computer system.

13. The method of claim 10, wherein the synchronizing step further comprises:
    requesting missing events from the computer system if the sequence number is greater than the next expected sequence number.

14. The method of claim 10, wherein the synchronizing step further comprises:
    if the sequence number is less than the next expected sequence number, determining whether the event has already been received;
    transmitting missing events to the computer system from the central repository if the event has not already been received; and discarding the event if the event has already been received.

15. A system for measuring availability of computer systems, comprising:
- a network;
- a local support computer coupled to said network;
- a computer system coupled to the network, said computer system programmed to monitor itself for availability and to transmit availability events to said local support node; and
- a cluster of computers coupled to the network, said cluster of computers comprised of nodes and packages, each of the nodes being programmed to monitor itself for cluster, node and package availability and to transmit availability events to said local support node, wherein said local support node computes availability for the computer system and the cluster of computers based on the availability events received.

16. The system of claim 15, further comprising:
- a remote support computer connectable to said local support computer for remotely operating said local support computer and for receiving availability data from said local support computer.

* * * * *